US005086438A

United States Patent [19]

Sugata et al.

[11] Patent Number: 5,086,438

[45] Date of Patent: Feb. 4, 1992

[54] SIGNAL GENERATING AND RECEIVING APPARATUSES BASED ON SYNCHRONOUS TRANSFER MODE

[75] Inventors: Fujio Sugata, Hadano; Masatoshi Ohtake, Isehara; Hidefumi Fujiwara, Zama, all of Japan

[73] Assignee: Anritsu Corporation, Tokyo, Japan

[21] Appl. No.: 635,614

[22] PCT Filed: Apr. 27, 1990

[86] PCT No.: PCT/JP90/00554

§ 371 Date: Dec. 20, 1990

§ 102(e) Date: Dec. 20, 1990

[87] PCT Pub. No.: WO90/13955

PCT Pub. Date: Nov. 15, 1990

[30] Foreign Application Priority Data

Apr. 28, 1989 [JP] Japan ................................ 1-111284

[51] Int. Cl.⁵ ................................ H04L 7/04

[52] U.S. Cl. ................................ 375/114; 370/105.4

[58] Field of Search ............... 375/106, 111, 114, 116; 370/100, 105.1, 105.4, 110.1; 328/63

[56] References Cited

U.S. PATENT DOCUMENTS 3,883,729 5/1975 de Cremiers ..................... 370/105.4
4,943,985 7/1990 Gherardi ............................ 375/114

FOREIGN PATENT DOCUMENTS 63-222532 9/1988 Japan .

OTHER PUBLICATIONS

Technical Advisory, TA-TSY-000253 (Sonet) Bellcore Issue 4, Feb. 1989.

CCITT-Recommendation, G. 707, G. 708, G. 709 (SDH) (Undated).

*Primary Examiner*—Benedict V. Safourek

*Attorney, Agent, or Firm*—Frishauf, Holtz, Goodman & Woodward

[57] ABSTRACT

A signal generating apparatus of this invention includes a timing signal generation unit (N), a signal generation unit (M) for generating a desired signal on the basis of a timing signal generated by the timing signal generation unit (N), and a signal synthesizer (S). The timing signal generation unit (N) includes a first counter (N1), a coincidence discrimination circuit (N2), a second counter (N3), a timing signal generator (N4), and an identification signal generator (N5). The timing signal generation unit (N) generates a timing signal for inserting the pattern signal in a predetermined portion. The signal generation unit (M) includes an additional signal generator (M1), an overhead signal generator (M2), and a pattern signal generator (M3). The signal synthesizer (S) synthesizes the pattern signal with the additional signal and the overhead signal, and outputs a synthesized signal. The coincidence discrimination circuit (N2) receives address information representing a desired information signal position. The second counter (N3) and the timing signal generator (N4) perform substantially predetermined operations for the address information at an arbitrary position.

8 Claims, 37 Drawing Sheets

TOH

| | | |
|---|---|---|
| A1 | A2 | C1 |
| B1 | E1 | F1 |
| D1 | D2 | D3 |
| H1 | H2 | H3 |
| B2 | K1 | K2 |
| D4 | D5 | D6 |
| D7 | D8 | D9 |
| D10 | D11 | D12 |
| Z1 | Z2 | Z3 |

POH

| |
|---|
| J1 |
| B3 |
| C2 |
| G1 |
| F2 |
| H4 |
| Z3 |
| Z4 |
| Z5 |

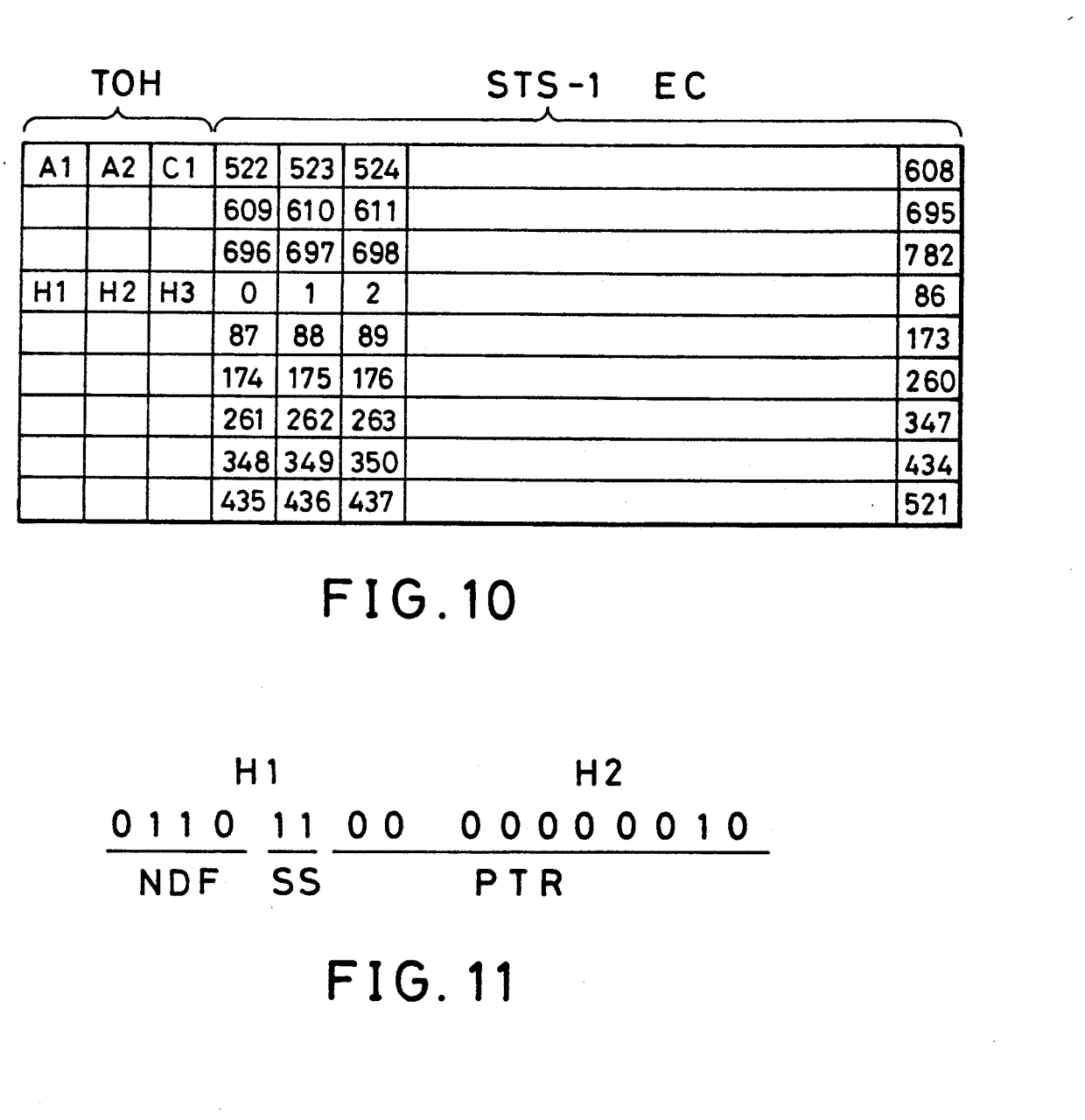

| TOH | | | STS-1 EC | | | | |
|---|---|---|---|---|---|---|---|
| A1 | A2 | C1 | 522 | 523 | 524 | | 608 |
| | | | 609 | 610 | 611 | | 695 |
| | | | 696 | 697 | 698 | | 782 |
| H1 | H2 | H3 | 0 | 1 | 2 | | 86 |
| | | | 87 | 88 | 89 | | 173 |
| | | | 174 | 175 | 176 | | 260 |
| | | | 261 | 262 | 263 | | 347 |
| | | | 348 | 349 | 350 | | 434 |
| | | | 435 | 436 | 437 | | 521 |

NDF SS PTR

FIG. 11

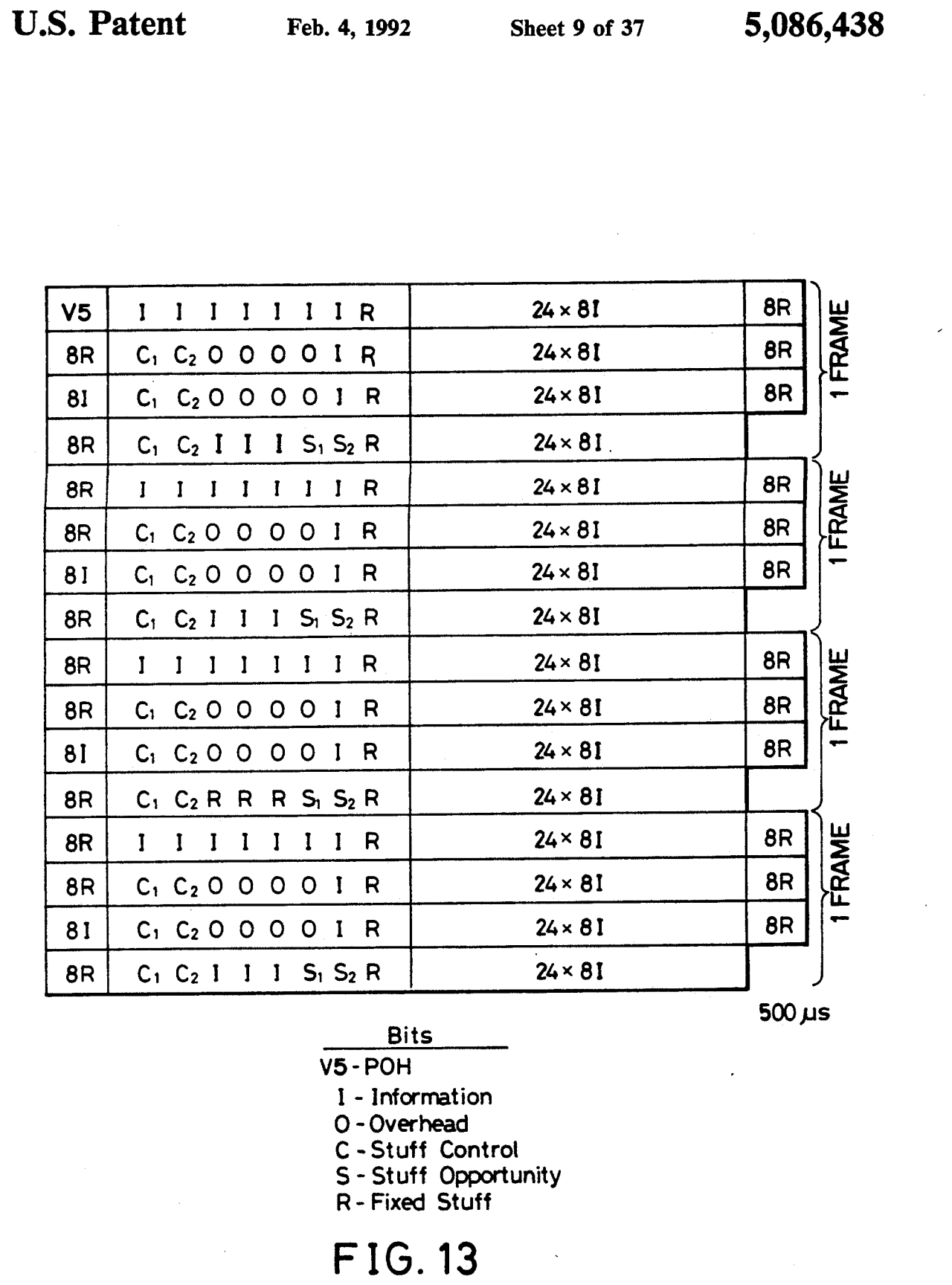

| | | | | |
|---|---|---|---|---|
| V5 | I I I I I I I R | 24 × 8I | 8R | 1 FRAME |
| 8R | $C_1$ $C_2$ O O O O I R | 24 × 8I | 8R | |
| 8I | $C_1$ $C_2$ O O O O I R | 24 × 8I | 8R | |
| 8R | $C_1$ $C_2$ I I I $S_1$ $S_2$ R | 24 × 8I | | |
| 8R | I I I I I I I R | 24 × 8I | 8R | 1 FRAME |
| 8R | $C_1$ $C_2$ O O O O I R | 24 × 8I | 8R | |
| 8I | $C_1$ $C_2$ O O O O I R | 24 × 8I | 8R | |
| 8R | $C_1$ $C_2$ I I I $S_1$ $S_2$ R | 24 × 8I | | |
| 8R | I I I I I I I R | 24 × 8I | 8R | 1 FRAME |
| 8R | $C_1$ $C_2$ O O O O I R | 24 × 8I | 8R | |
| 8I | $C_1$ $C_2$ O O O O I R | 24 × 8I | 8R | |
| 8R | $C_1$ $C_2$ R R R $S_1$ $S_2$ R | 24 × 8I | | |
| 8R | I I I I I I I R | 24 × 8I | 8R | 1 FRAME |
| 8R | $C_1$ $C_2$ O O O O I R | 24 × 8I | 8R | |
| 8I | $C_1$ $C_2$ O O O O I R | 24 × 8I | 8R | |
| 8R | $C_1$ $C_2$ I I I $S_1$ $S_2$ R | 24 × 8I | | |

500 μs

Bits

V5 - POH
I - Information
O - Overhead
C - Stuff Control
S - Stuff Opportunity
R - Fixed Stuff

FIG. 13

| | | | | | | | | |
|---|---|---|---|---|---|---|---|---|
| A1 | A1 | A1 | A2 | A2 | A2 | C1 | C1 | C1 |
| B1 | | | E1 | | | F1 | | |
| D1 | | | D2 | | | D3 | | |
| H1 | H1 | H1 | H2 | H2 | H2 | H3 | H3 | H3 |
| B2 | B2 | B2 | K1 | | | K2 | | |
| D4 | | | D5 | | | D6 | | |
| D7 | | | D8 | | | D9 | | |
| D10 | | | D11 | | | D12 | | |
| Z1 | Z1 | Z1 | Z2 | Z2 | Z2 | E2 | | |

FIG. 20

9 ROWS

| TOH | | | STS-1 EC | | | |
|---|---|---|---|---|---|---|
| 0 | 1 | 2 | 3 | 4 | ------ | 89 |
| 90 | 91 | 92 | 93 | 94 | ------ | 179 |
| 180 | 181 | 182 | 183 | 184 | ------ | 269 |
| 270 | 271 | 272 | 273 | 274 | ------ | 359 |
| 360 | 361 | 362 | 363 | 364 | ------ | 449 |
| --- | --- | --- | --- | --- | --- | --- |
| --- | --- | --- | --- | --- | --- | --- |
| --- | --- | --- | --- | --- | --- | --- |
| 720 | 721 | 722 | 723 | 724 | ------ | 809 |

FIG. 21

3 BYTES; 87 BYTES; 9 ROWS

| | | | | | | | |
|---|---|---|---|---|---|---|---|
| A1 | A2 | C1 | 522 | 523 | 524 | | 608 |
| B1 | E1 | F1 | 609 | 610 | 611 | | 695 |
| D1 | D2 | D3 | 696 | 697 | 698 | | 782 |
| H1 | H2 | H3 | 0 | 1 | 2 | | 86 |
| B2 | K1 | K2 | 87 | 88 | 89 | | 173 |
| D4 | D5 | D6 | 174 | 175 | 176 | | 260 |
| D7 | D8 | D9 | 261 | 262 | 263 | | 347 |
| D10 | D11 | D12 | 348 | 349 | 350 | | 434 |
| Z1 | Z2 | Z3 | 435 | 436 | 437 | | 521 |

TOH (Transport Overhead) STS-1 EC (Envelope Capacity)

PTR VALUE SETUP AND ADDRESS VALUE CALCULATION FLOW
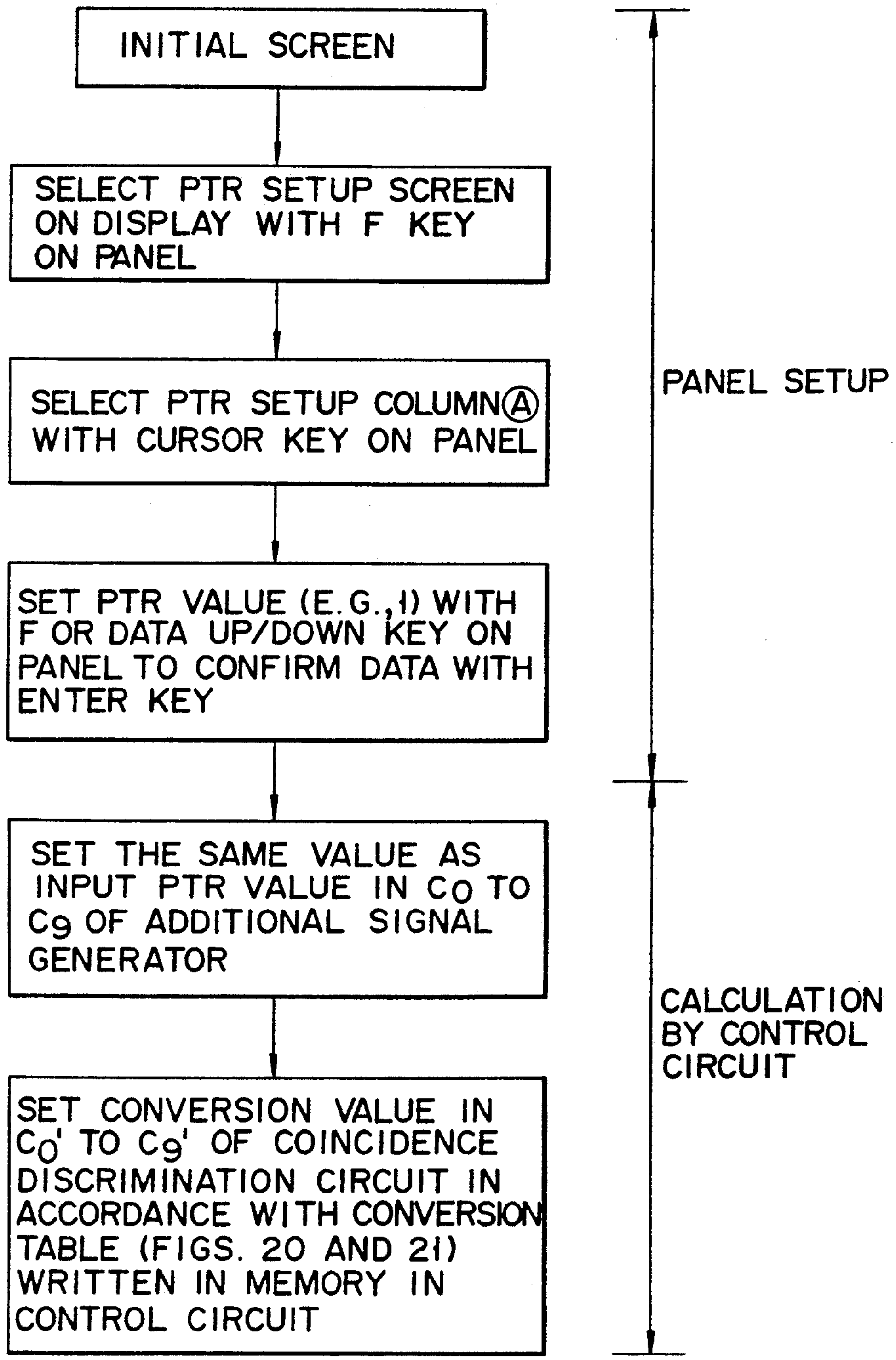
F I G. 24

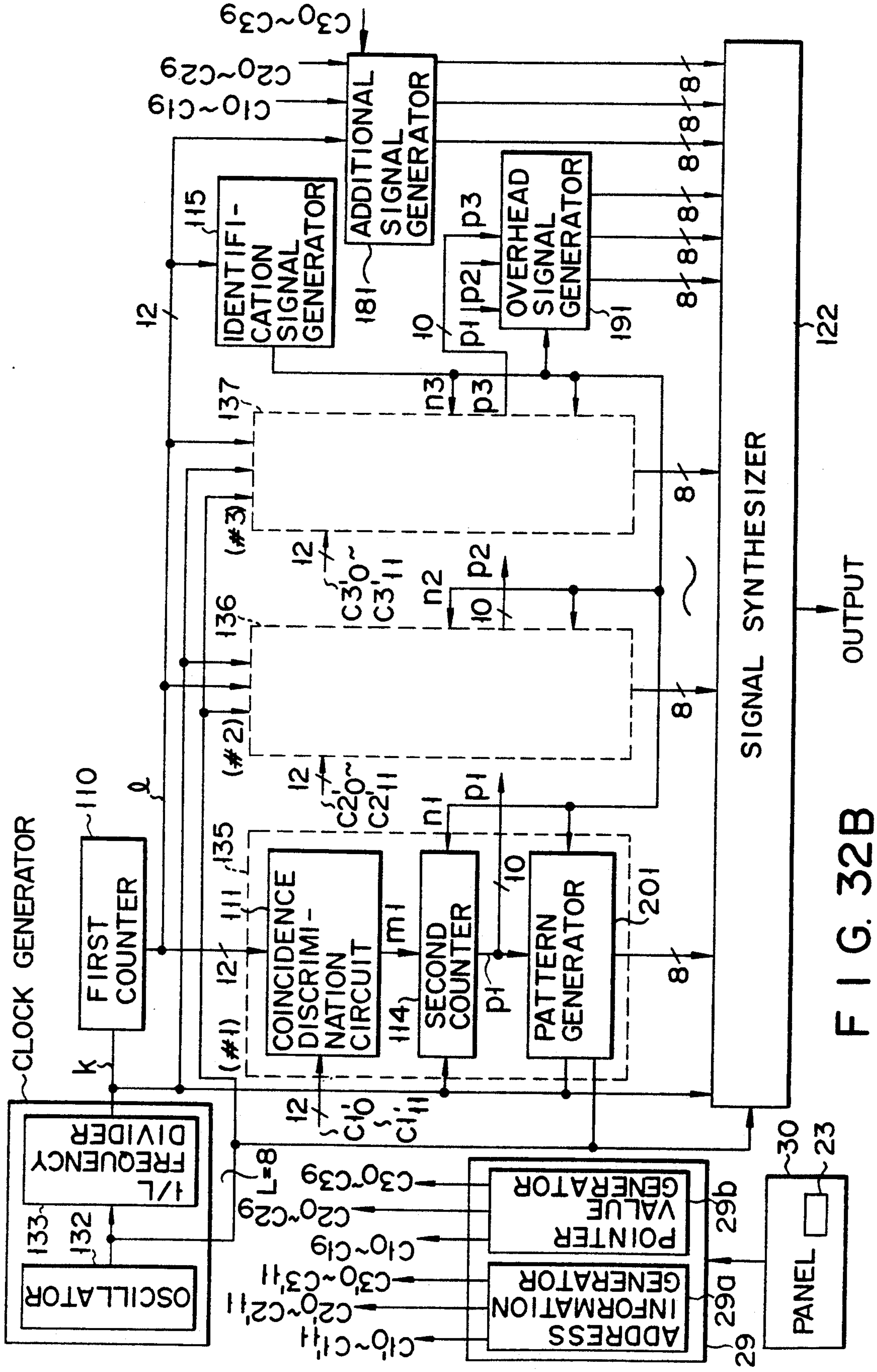
F I G. 32B

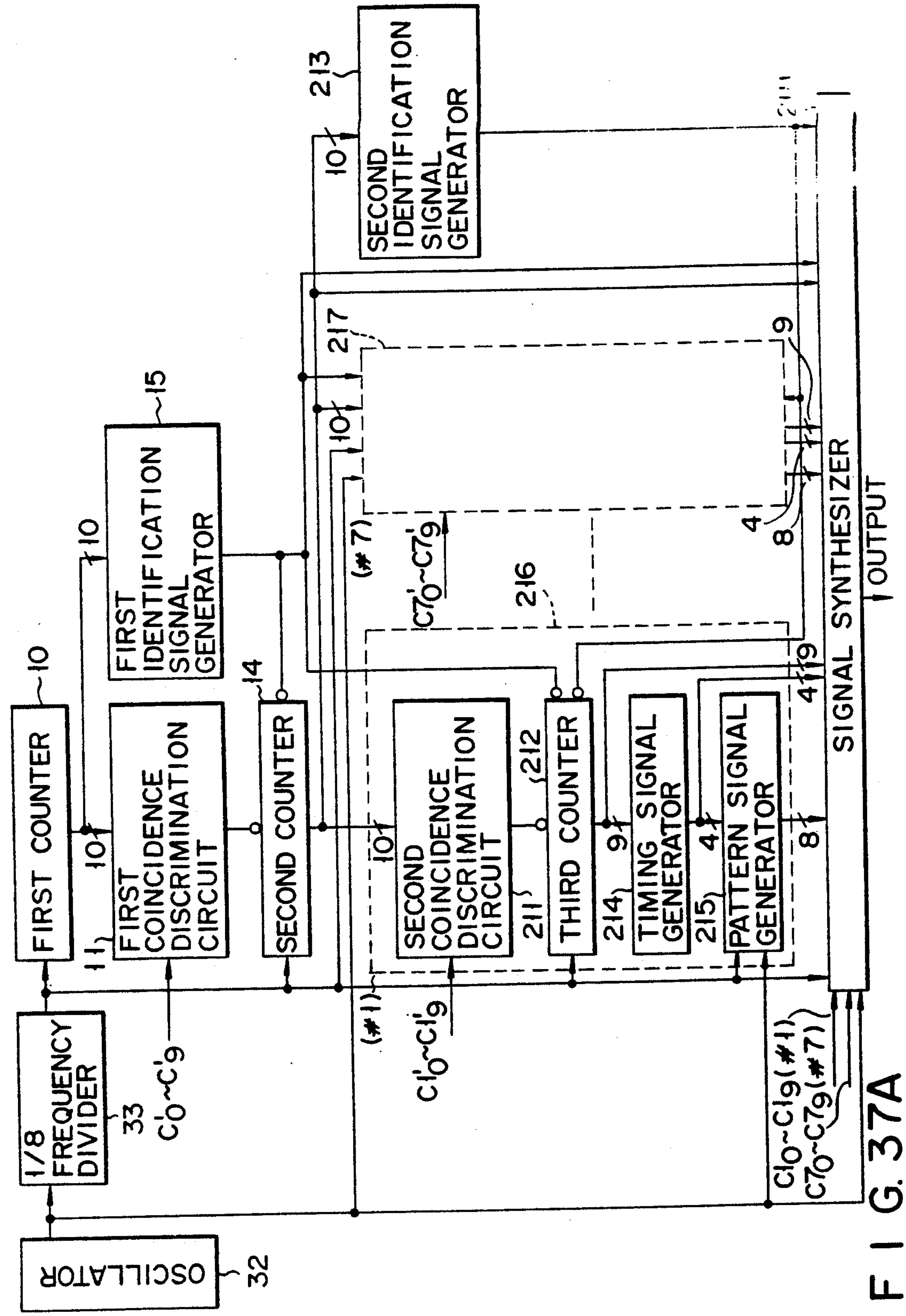
F I G. 37A

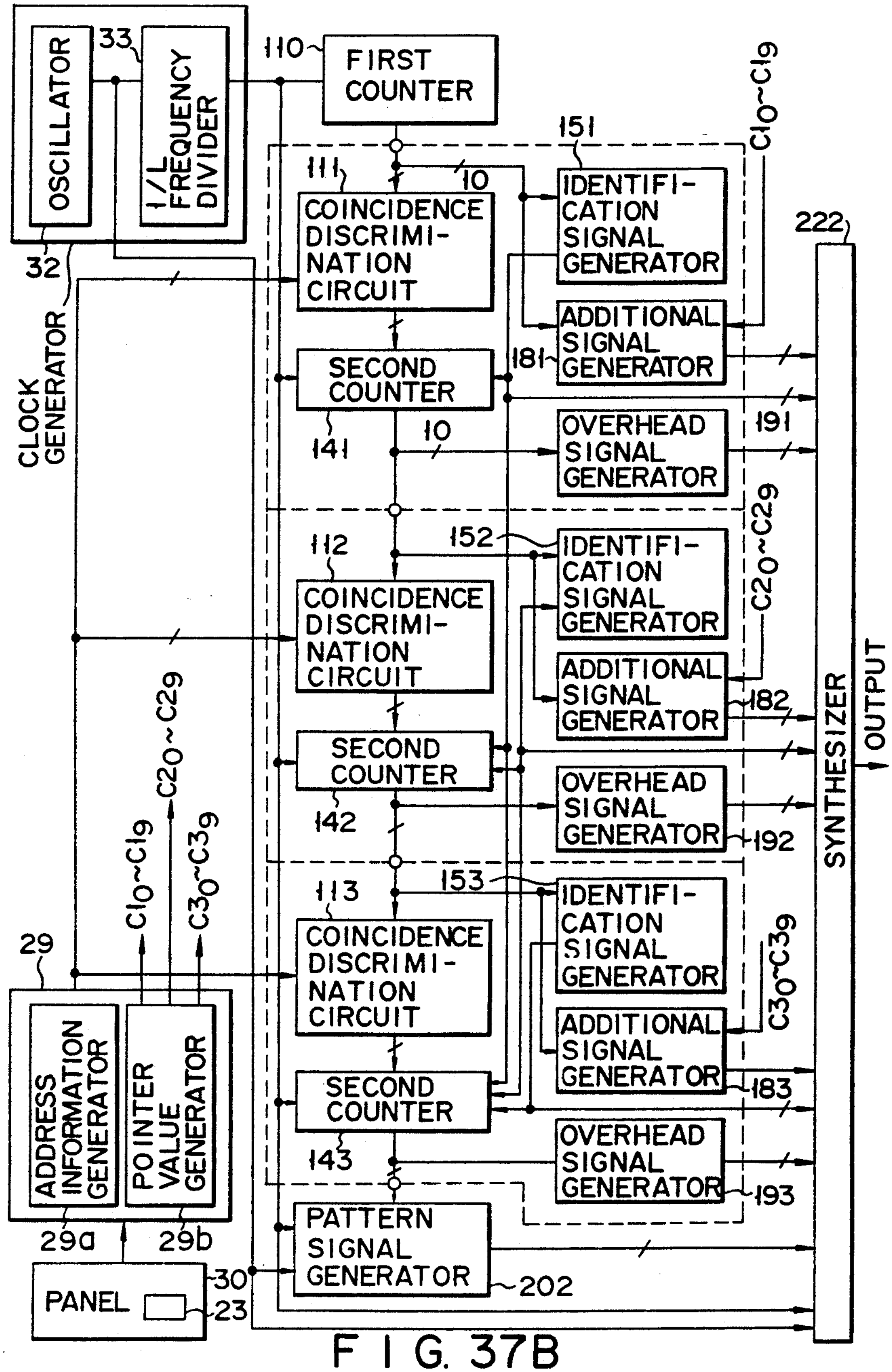
F I G. 37B

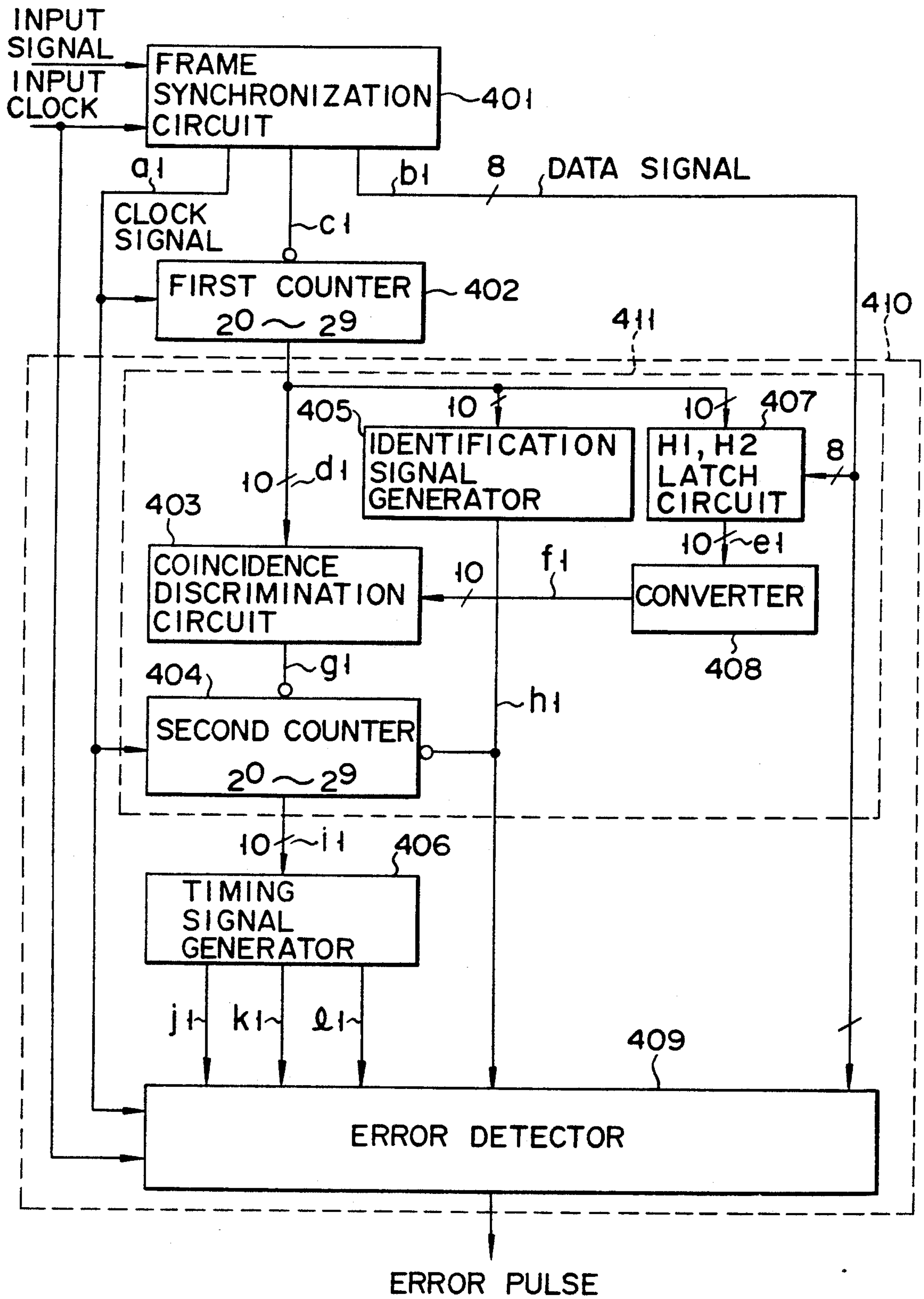
F I G. 38A

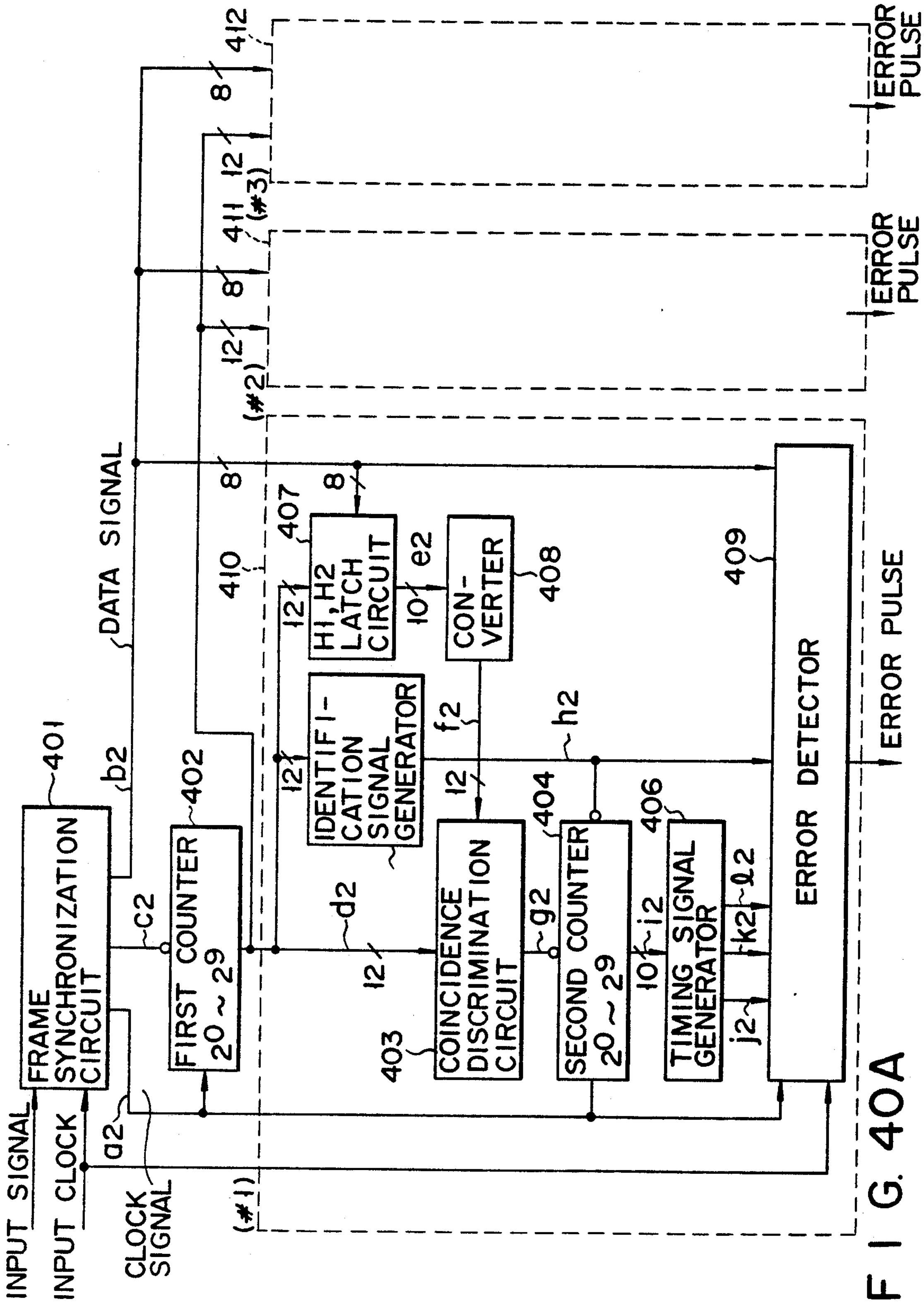
F I G. 40A

SIGNAL GENERATING AND RECEIVING APPARATUSES BASED ON SYNCHRONOUS TRANSFER MODE

FIELD OF THE INVENTION

The present invention relates to signal generating and receiving apparatuses for performing quality evaluation including, e.g., measurement of an error rate in a transmission line, a multiplexer, a demultiplexer, or the like used in an SONET (Synchronous Optical Network) or an SDH (Synchronous Digital Hierarchy) as a new synchronous transfer mode as a digital communication scheme and, more particularly, to signal generating and receiving apparatuses of a synchronous transfer mode each having a timing signal generator for generating timing signals to arrange a signal string having a predetermined frame structure determined by the new synchronous transfer mode so as to obtain an array of predetermined signals at designated signal positions.

DESCRIPTION OF THE RELATED ART

A synchronous transfer mode has been used in a general digital communication line to effectively utilize a transmission line.

An example of a conventional synchronous transfer mode will be described with reference to FIG. 1. At a transmitting side, a first multiplexer (MUX) 1 multiplexes (time-divisionally multiplexes) twenty-four 64-kbits/second (64 kb/s) signals into a 1.544-Mb/s signal. A second MUX 2 multiplexes four 1.544-Mb/s signals into a 6.312-Mb/s signal. A third MUX 3 multiplexes seven 6.312-Mb/s signals into a 44.736-Mb/s signal. A fourth MUX 4 multiplexes three 44.736-Mb/s signals into a 139.264-Mb/s signal. At a receiving side, the 139.264-Mb/s signal, the 44.736-Mb/s signal, the 6.312-Mb/s signal, and the 1.544-Mb/s signal are respectively demultiplexed by first to fourth demultiplexers (DMUXs) 5 to 8 in a sequence opposite to that at the transmitting side.

A relationship between multiplexing and frame synchronization at the transmitting side of FIG. 1 will be briefly described with reference to FIGS. 2 and 3.

As shown in FIG. 2, an A-channel (Achl to AchN, which correspond to the 64-kb/s signal in FIG. 1) is time-divided by the first MUX 1, thereby multiplexing the time-divisional signals in a sequence A in FIG. 3.

This multiplexed signal is defined as one (Bchl) of B-channel (Bchl to BchM which correspond to the 1.544-Mb/s signal in FIG. 1) signals. The second MUX 2 performs time-divisional multiplexing between this B-channel signal and a signal (Bch2 to BchM) similarly input from another multiplexer (not shown) and outputs a multiplexed signal in a sequence B in FIG. 3. This multiplexed signal is defined as one of (Cchl) C-channel (Cchl to CchL which correspond to the 6.312-Mb/s signal in FIG. 1) signals. The MUX 3 performs time-divisional multiplexing between this Ch-channel signal and a signal (Cch2 to CchL) similarly input from another multiplexer (not shown) and outputs a multiplexed signal in a sequence C in FIG. 3.

Reference symbols Fa, Fb, and Fc in the sequences A, B, and C in FIG. 3 are frame signals for identifying the channel signals, respectively.

In order to extract a low-order group signal from a multiplexed high-order group signal, for example, in order to extract the C-channel signal Cchl from an output C from the third MUX 3, the output C from the third MUX 3 is frame-synchronized. However, in order to extract the B-channel signal Bchl from the output C, an output B from the second MUX 2 must be frame-synchronized after the output C is frame-synchronized. When a lower-order signal is to be extracted, these frame synchronization operations must be sequentially performed.

Since one frame can contain only signals having the same magnitude (speed), the number of frame synchronization operations is increased in correspondence with the number of orders upon an increase in order in a conventional synchronous transfer mode. Therefore, a system including various types of equipment connected to a digital communication line is complicated as a whole, resulting in inconvenience.

It is impossible to directly extract the frame signal Fa of an output A from the output C due to the following reason.

When the number of bits assigned to each input channel signal of an output signal from a given MUX is fixed in correspondence with a nominal frequency ratio, the frequency of the input is not synchronous with that of the output. Therefore, the number of bits assigned to a given channel signal becomes different from that assigned to another channel signal with a lapse of time.

For this reason, some of bits assigned to input signals are used to absorb the above difference in a conventional MUX. That is, if the number of bits of an input signal is increased, the input signal is assigned with the specific bit. However, when the number of bits of an input signal is decreased, a dummy signal (1 or 0) is assigned with the specific bit. For example, in order to multiplex 1.544-Mb/s signals into a 6.312-Mb/s signal, the above assignment operation is performed by one bit every 1,176 bits.

The position of the input signal derived from the output signal is changed, and the signal cannot be extracted. For this reason the signal must be extracted in synchronism with the frames in an order of the outputs C, B, and A. The frame signal (e.g., Fc of the output C in FIG. 3) is partially used to determine whether the specific bit represents the input signal or the dummy signal. When the part of the frame signal Fc is given as 111, the specific bit represents the dummy signal. However, when the part of the frame signal Fc is given as 000, the specific bit represents the real signal.

Transmission quality of a digital communication line is generally evaluated in accordance with a rate of change in pulse, i.e., an error rate.

A conventional error rate measurement is performed by a transmission/reception system shown in FIG. 4. More specifically, a signal generating apparatus 10 serving as a transmitting side causes a pattern generator 10*a* to generate a pseudo random pattern similar to a signal used in a practical line. A frame signal adder 10*b* adds a predetermined frame signal F to this pattern to send out an illustrated transmission pattern (10F010100) onto a digital communication line 11. At the receiving side, a signal receiving apparatus 12 for receiving the transmitted pattern as a reception pattern causes a frame signal eliminating circuit 12*a* to eliminate the frame signal F from the reception pattern. A comparator 12*c* compares the reception pattern with a comparison reference pattern having the same pattern as the sent pattern (except for the frame signal F) and generated by a comparison reference pattern generator 12*b*, thereby detecting error pulses. At the same time, an error pulse counter 12*d* counts the error pulses and calculates an error rate. The error rate is displayed on a display 12e. Note that the comparison reference pattern generator 12b is operated in synchronism with reception pattern timings in accordance with a sync signal from a synchronizing circuit 12f controlled in response to an output from the error pulse counter 12d.

FIG. 5 shows a concept for actually measuring an error rate of a digital communication line by using the signal generating and receiving apparatuses for measuring the error rate. A measurement 1 is a measurement of a time interval between a transmitting 1.544-Mb/s signal and a receiving 1.544-Mb/s signal, and the frame synchronization must be performed once in the signal receiving apparatus. A measurement 2 is a measurement of a time interval between a transmitting 1.544-Mb/s signal and a receiving 139.264-Mb/s signal, and the frame synchronization must be performed three times in the signal receiving apparatus.

In the conventional synchronous transfer mode, since one frame can contain only signals having the same magnitude (speed), the number of frame synchronization operations corresponding to the number of orders must be performed to access a low-order group signal from a high-order group signal in the signal receiving apparatus during an error rate measurement when the number of multiplexing orders is increased. Therefore, an error rate measurement system is complicated, resulting in inconvenience.

In recent years, there is provided a new synchronous transfer mode for facilitating access of a low-order group signal from a high-order group signal, simplifying a system as a whole, and providing a new frame structure for containing signals having different magnitudes (speeds) within one frame. An apparatus based on this transfer mode is being developed.

This mode is called an SONET (Synchronous Optical Network) or an SDH (Synchronous Digital Hierarchy), and its details are described in TECHNICAL ADVISORY TA-TSY-000253 (SONET), Bellcore, or CCITT-Recommendation G.707, G708, G709 (SDH).

An SONET synchronous transfer mode will be briefly described below.

FIG. 6 shows a basic frame structure according to the SONET. One frame consists of a TOH (Transport Overhead) portion which contains network management information serving as an additional signal, and an STS-1 EC (Envelope Capacity) portion which contains an input signal. One frame consists of 810 bytes (=90 bytes × 9 rows). One byte corresponds to eight bits of a clock signal. The length of time of one frame is 125 μs, which derives 51.84 Mb/s (=90×9×8×8 kb/s).

In the SONET, the 1.544-Mb/s, 6.312-Mb/s, and 44.736-Mb/s signals are contained in the SONET format.

The signal string is stored rightward and downward in FIG. 6.

FIG. 7 shows the content of the TOH. Reference symbols A1 and A2 in the TOH denote frame sync signals. Since other signals except for signal H1,H2 (to be described later) are not directly associated with the present invention, please refer to the above literature for these signals.

An input signal is not directly contained in the STS-1 EC portion, but is contained in a signal string shown in FIG. 8. FIG. 8 shows a case in which a 44.736-Mb/s signal is stored in a frame. The frame consists of a POH (Path Overhead) portion for storing network management information and an STS-1 PC (Payload Capacity) portion for storing an input signal as in FIG. 6.

The content of the POH portion is shown in FIG. 9.

The 44.736-Mb/s signal is contained in parts of the information I portion and a stuff S portion shown in FIG. 8.

The signal string shown in FIG. 8 is contained in the STS-1 EC portion having the same size as that in FIG. 6. However, a start signal (J1 of POH) in FIG. 8 is arranged at a predetermined position within the STS-1 EC portion, and the subsequent signals in FIG. 8 follow the start signal.

The position of the start signal (J1 of POH) in FIG. 8 may be shifted with a lapse of time. Please refer to the above literature for this shift.

Since the start signal (J1) in FIG. 8 may be shifted, the receiving side requires a signal representing a position of the start signal (J1) of FIG. 8 in the format of FIG. 6 to extract the signal of FIG. 8 from the STS-1 EC portion.

The signal representing the position of the start signal (J1) is the signal H1, H2 within the TOH shown in FIG. 7.

In order to cause the signal H1,H2 to represent the J1 position within the STS-1 EC portion, addressing within the STS-1 EC portion is required so that addresses 0 to 782 are assigned in the STS-1 EC portion in the above literature, as shown in FIG. 10.

A format of the signal H1,H2 is shown in FIG. 11.

A binary code consisting of 10 lower bits of the signal H1, H2 is called a pointer (PTR). A PTR value represents an address of the start signal (J1). FIG. 11 shows PTR value=2.

FIG. 12 shows a format in which the signal string of FIG. 8 for PTR value=2 is contained in the signal string of FIG. 6. A hatched portion in FIG. 12 represents an entire signal string (one frame) of FIG. 8. When the format in FIG. 6 is defined as the basic frame, the signal string is contained across two frames.

An operation for containing a 1.544-Mb/s or 6.312-Mb/s signal will be described below.

In this case, another signal string must be prepared. After an input signal is contained in a signal string shown in FIG. 13, the signal string in FIG. 13 is then contained in a signal string (FIG. 14) having the same size as that in FIG. 8. The signal string shown in FIG. 14 is contained in the signal string shown in FIG. 6 in the same format as in FIG. 8.

A frame structure which contains the 1.544-Mb/s or 6.312-Mb/s signal has a three-layered hierarchical structure of the first (FIG. 6), second (FIG. 14), and third (FIG. 13) signal strings.

An operation for containing a 6.312-Mb/s signal will be described below. In this case, a 6.312-Mb/s signal 7ch is contained in the second signal string. An operation for containing a 1.544-Mb/s signal or a mixture of 6.312-Mb/s and 1.544-Mb/s signals can be performed in the following manner. Please refer to the above literature for further details.

FIG. 13 shows a third signal string which contains a 6.312-Mb/s signal. The 6.312-Mb/s signal is contained in an information I portion and a stuff portion (S1 and S2) in FIG. 13. In this case, a frame structure is a multiframe structure consisting of four frames. The first one byte of each frame is a POH portion (only the first frame is used as the POH in practice), and the remaining bytes constitute a payload capacity portion.

FIG. 14 shows a second signal string consisting of a POH portion, a PTR portion, and an STS-1 PC portion.

The content of the POH in FIG. 14 is the same as that of the POH in FIG. 8.

The PTR in FIG. 14 is used for the same function as the signal H1,H2 in FIG. 7. The PTR portion has 7 bytes, which are the same as the number of 6.312-Mb/s signals (the number of channels) contained in the format of FIG. 13. The PTR portion represents the start address of each channel.

The PTR portion of each channel has one byte per frame, and four bytes (V1, V2, V3, and V4) of the four frames constitute a basic unit. The first two types (V1 and V2) has the same function as the signal H1,H2 in FIG. 11. As shown in FIG. 14, the third signal strings (represented by #1, #2, . . . , #7) are alternately arranged in units of bytes. FIG. 15 shows addressing corresponding to the PTR portion. An addressing cycle is completed every four frames. The seven same numbers are repeated in correspondence with the number of third signal strings.

Finally, an operation for containing three 44.736-Mb/s signals will be described below.

In the synchronous transfer mode, when a plurality of 44.736-Mb/s signals are to be contained or 44.736-Mb/s and 6.312-Mb/s signals are to be simultaneously contained, a frame structure obtained as an integer (integer=N) multiple of the 51.84-Mb/s basic frame is used to cope with this operation. In the SONET mode, the N value is defined, and an operation for N=3 will be exemplified.

If N=3, then an operating frequency is 155.52 Mb/s (=51.84 Mb/s × 3).

The corresponding frame structure is shown in FIG. 16, and the content of its TOH portion is shown in FIG. 17.

The three 44.736-Mb/s signal strings are contained in the second signal string of FIG. 8 in the formats described above.

The signal string in FIG. 8 is contained in an STS-3c EC portion (FIG. 16) in units of bytes (#1, #2, and #3). The signal strings in FIG. 16 can have independent PTR values. For this reasons, three signals H1,H2 are used in correspondence with the three independent PTR values.

Addressing in the STS-3c EC portion is shown in FIG. 18. The three same addresses are repeated.

An operation for extracting a signal in a synchronous transfer mode will be described below.

An operation for extracting a 6.312-Mb/s signal from a 155.52-Mb/s signal will be exemplified below.

A signal H1,H2 is extracted from the first signal string in synchronism (frame synchronization) with a frame sync signal (A1,A2 in FIG. 17) in the input signal. The PTR value of the signal H1,H2 is read, and the position of the start byte (J1) of the second signal string is specified on the basis of the read PTR value. The signals V1 and V2 (FIG. 15) following the start byte are extracted. The position of a start byte (V5) of the third signal string is specified on the basis of the PTR values of the signals V1 and V2, and the subsequent signals are then extracted.

In the synchronous transfer mode described above, only one frame synchronization operation is performed, so that the system can be simpler than the conventional system as a whole. In this new mode, after frame synchronization is completed, the PTR value of a signal to be extracted is read, and the start position of this signal to be extracted is known. Therefore, the signal to be extracted can be easily extracted.

A transmitting apparatus for outputting a test signal for performing various quality evaluation tests such as an error measurement for a digital communication system of the above synchronous transfer system, and a receiving apparatus for performing the error measurement in response to this test signal must have a unique function which is not assigned to a conventional error measurement unit.

More specifically, the transmitting apparatus must generate signals except for the POH signal, the TOH signal, and the information I signal, and at the same time, a test signal must be inserted into the information I portion. In addition, a function of setting the PTR value within an entire range (e.g., the range of 0 to 782) must be provided, and the POH signal, the TOH signal, and generation and insertion of each signal containing the test signal to the information portion are required in the entire range of the PTR value.

The receiving apparatus must extract the test signal from an input signal containing any PTR value synthesized by the transmitting apparatus and must perform error detection.

In addition, versatility for performing other various quality evaluation tests in addition to a simple error rate measurement is also required.

In order to enhance simplicity of an entire system according to the synchronous transfer mode described above, demand has naturally arisen for facilitating the arrangement as much as possible such that the transmitting and receiving apparatuses are caused to share some units.

There are no transmitting and receiving apparatuses for aiming at performing quality evaluation tests of digital communication systems of the existing synchronous transfer modes to provide the above unique function in a simplest arrangement.

SUMMARY OF THE INVENTION

The present invention has been made in consideration of the above situation, and has as its object to provide excellent, simplest signal generating and receiving apparatuses of a synchronous transfer mode, capable of realizing a unique function of performing quality evaluation tests for a digital communication line system of a new synchronous transfer mode such as an SONET and capable of providing a variety of applications.

The present invention will be generally described below. The signal generating apparatus serving as a transmitting side has a characteristic arrangement which can correspond to setup of the PTR values in the entire range of one frame of an output signal in the synchronous transfer mode such as an SONET and which can arrange information signals (input or test signal) within the frame at appropriate positions.

As shown in FIG. 19A, the signal generating apparatus according to the present invention comprises a timing signal generation unit N, a signal generation unit M for generating a desired signal on the basis of the timing signal generation unit N, and a signal synthesizer S.

In the timing signal generation unit N, a first counter N1 counts predetermined clocks to define a one-frame period (time frame) of an output signal obtained in a synchronous transfer mode and sequentially outputs intermediate values. In this case, a relationship between the intermediate count values and their timings is a very important factor. A coincidence discrimination circuit N2 which receives the count values causes a second counter N3 to start a counting operation every timing corresponding to the start position based on the count value in accordance with address information for setting the start position of the information signal at a desired position within the frame. The second counter N3 starts counting the information signal from its start position and sequentially outputs the intermediate count values. At the same time, the second counter N3 counts the information signal range. The count value of the information signal range represents the range including a pattern signal, a POH signal, and a predetermined permanent signal. A count time of the information signal range is equal to the one-frame period. In this case, a start timing of counting and timings of intermediate count values are important factors.

A timing signal generator N4 for receiving the count values from the second counter N3 outputs a timing signal when an input count value coincides with a prestored pattern signal value. In this case, the POH signal can be positioned within the frame because starting of the second counter N3 is determined by an output from the coincidence discrimination circuit N2.

An identification signal generator N5 receives the count values from the first counter N1 and generates a signal for controlling and identifying a time interval of an additional signal and a time interval of an information signal with reference to the start of one frame.

In the signal generation unit M, an additional signal generator M1 receives the count values from the first counter N1 and generates a predetermined additional signal to be inserted into the above time interval.

An overhead signal generator M2 receives the count values from the second counter N3 and an output from the identification signal generator N5 and generates a predetermined overhead signal during a time interval except for the time interval of the information signal and a time interval of the test signal.

A pattern signal generator M3 receives an output from the timing signal generator N4 and an output from the identification signal generator N5 and generates the pattern signal during the time interval of the test signal.

The signal synthesizer S receives the signals from the signal generation unit M, i.e., the additional signal, the overhead signal, and the pattern signal, synthesizes them, and outputs a synthesized signal.

In the above operation, the additional signal generator M1 may have data associated with the additional signal or may obtain an external PTR value or the like. The overhead signal generator M2 has data of the POH signal. The pattern signal generator M3 has a pattern signal to be output.

In the signal generating apparatus having the above arrangement, when the main circuit arrangement sets and inputs the position of the desired information signal to the coincidence discrimination circuit N2 as address information, the position of the information signal in the frame can be arbitrarily set. That is, the second counter N3 and the timing signal generator N4 perform only predetermined operations for arbitrary address information, thereby simplifying the circuit arrangement as a whole.

If gate circuits for generating desired timing signals corresponding to the number of all pieces of address information are used, the number of gate circuits becomes extremely large.

The present invention has advantages in that a predetermined number of timing signal generation units N are cascade-connected to generate an information signal having a more complicated format, thereby further simplifying the circuit arrangement.

The main part of the signal receiving apparatus serving as a receiving side can be basically common to that of the signal generating apparatus shown in FIG. 19A.

According to the above principle of the present invention, there is provided a signal generating apparatus of a synchronous transfer mode, wherein one frame includes an additional signal containing region assigned to a plurality of time intervals each having a predetermined duration for containing an additional signal and an information signal containing region serving as a region interleaved with but not overlapping the additional signal containing region, and the information signal includes at least one path overhead signal representing a start portion of the information signal and a pattern signal which appears in a plurality of time intervals each having a predetermined duration and which follows the path overhead signal, thereby generating a signal string containing the additional signal and the information signal in units of frames so as to locate the path overhead signal at an arbitrary position within the information signal containing region, comprising a clock generator for generating a system clock having a predetermined frequency corresponding to the one-frame period and a clock obtained by frequency-dividing the system clock by a predetermined value to represent a one-byte unit, a first counter for receiving the clock representing the one-byte unit from the clock generator, repeatedly counting a number of clocks corresponding to the one-frame period, and sequentially outputting count values, an identification signal generator for receiving the count values from the first counter and outputting an identification signal for identifying the additional signal containing region and the information signal containing region by using a count start timing of the first counter as a start of the one-frame period, an address information generator for outputting a desired insertion position of the path overhead signal in the information signal containing region as an address value from the start of the one-frame period and outputting a pointer value corresponding to the address value, a coincidence discrimination circuit for outputting a coincidence signal when the count value from the first counter coincides with the address value from the address information generator, a second counter for repeatedly counting a number of clocks which correspond to the information signal containing region except for the additional signal containing region of the one-frame period, which are output from the clock generator, and each of which represents the one-byte unit, in accordance with the identification signal output from the identification signal generator, and for sequentially outputting count values, a timing signal generator for receiving the count values from the second counter and outputting a timing signal for generating the pattern signal within the information signal containing region, a pattern signal generator for outputting a desired pattern signal during a time interval except for the path overhead signal from the information signal containing region in accordance with the system clock and the clock representing the one-byte unit, both clocks of which are output from the clock generator, an additional signal generator for receiving the count values from the first counter and the pointer value from the address information generator and outputting an additional signal containing at least the pointer value to a time interval of the additional signal containing range with reference to the start of the one-frame period, a path overhead signal generator for receiving the count values from the second counter and outputting a predetermined path overhead signal to a desired position within the information signal containing period, and a signal synthesizer for synthesizing the desired pattern signal from the pattern signal generator, the additional signal containing the pointer value from the additional signal generator, and the predetermined path overhead signal from the path overhead signal generator and outputting a synthesized signal as a predetermined signal string.

According to the present invention, there is also provided a signal receiving apparatus of a synchronous transfer mode, wherein one frame includes an additional signal containing region assigned to a plurality of time intervals each having a predetermined duration for containing an additional signal and an information signal containing region serving as a region interleaved with but not overlapping the additional signal containing region, and the information signal includes at least one path overhead signal representing a start portion of the information signal and a pattern signal which appears in a plurality of time intervals each having a predetermined duration and which follows the path overhead signal, thereby generating a signal string containing the additional signal and the information signal in units of frames so as to locate the path overhead signal at an arbitrary position within the information signal containing region, comprising a clock generator for generating a system clock having a predetermined frequency corresponding to the one-frame period and a clock obtained by frequency-dividing the system clock by a predetermined value to represent a one-byte unit, a first counter for receiving the clock representing the one-byte unit from the clock generator, repeatedly counting a number of clocks corresponding to the one-frame period, and sequentially outputting count values, an identification signal generator for receiving the count values from the first counter and outputting an identification signal for identifying the additional signal containing region and the information signal containing region by using a count start timing of the first counter as a start of the one-frame period, a position information detector for reading a value of the start position of the information signal in the information signal containing region from the additional signal within the additional signal containing region on the basis of the input signal string, and for outputting a read value, a start position detector for outputting a detection signal in accordance with an output from the first counter and the value representing the start position of the information signal from the position information detector when the start position in the information signal containing region is detected, a second counter for repeatedly counting a number of clocks corresponding to the entire information signal containing region except for the additional signal containing region from the clock signal on the basis of the identification signal from the identification signal generator every time the second counter receives the detection signal from the start position detector, and a pattern signal detector for extracting the pattern signal in accordance with an output from the second counter and the input signal string.

BRIEF DESCRIPTION OF THE DRAWINGS

FIG. 10 is a view showing addressing of the STS-1 EC portion of FIG. 6;

FIG. 11 is a view showing an example of a pointer portion H1,H2 of FIG. 10;

FIGS. 13 and 14 are views showing examples of formats in which second and third signal strings are contained in the SONET;

FIG. 20 is a view showing a content of a count value of a first counter of FIG. 19B;

FIG. 21 is a view showing a format of a basic frame of FIG. 19B;

FIG. 24 is a flow chart showing a flow for setting an address value and a PTR value in FIGS. 22 and 23;

FIGS. 32A and 32B are a block diagram showing a structure of the second embodiment of the signal generating apparatus according to the present invention and a block diagram showing a general structure of FIG. 32A;

FIGS. 37A and 37B are a block diagram showing a main part of a structure of the third embodiment of a signal generating apparatus according to the present invention and a block diagram showing a general structure of FIG. 37A;

FIGS. 38A and 38B are block diagrams showing structures when a signal receiving apparatus as the fourth embodiment is used for an error measuring apparatus;

FIGS. 40A and 40B are a block diagram showing a structure of a main part when the signal receiving apparatus as the fifth embodiment according to the present invention is used for an error measuring apparatus and a block diagram showing a general structure of FIG. 40A;

DETAILED DESCRIPTION OF THE EMBODIMENTS

Figure 1:
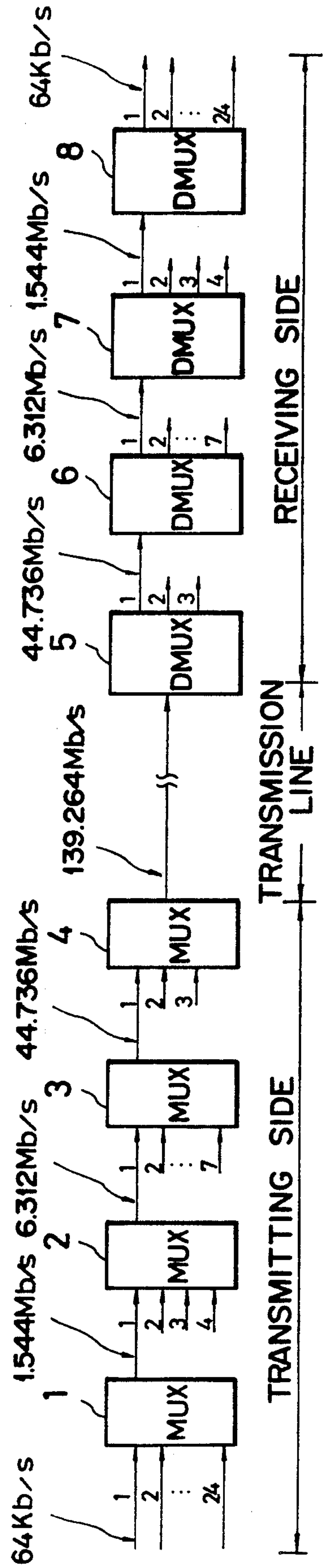
FIG. 1 is a schematic view showing a concept of multiplexing by a conventional synchronous transfer mode.
Figure 2:
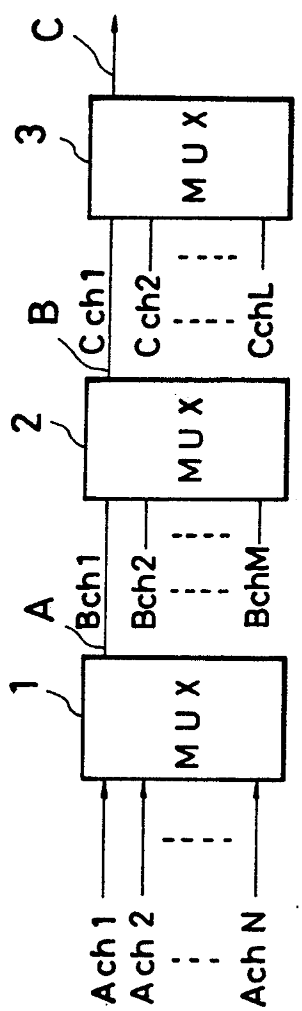
FIG. 2 is a block diagram showing an arrangement for obtaining a multiplexed signal according to the mode shown in FIG. 1.

Embodiments of the present invention by the above-described SONET will be described with reference to the accompanying drawings.

Referring to FIGS. 19A to 42B, the same or corresponding reference numerals denote the same or corresponding functions.

First Embodiment

1 Operation of Containing 44.736-Mb/s Signal in 51.84-Mb/s Signal String

Figure 19A:
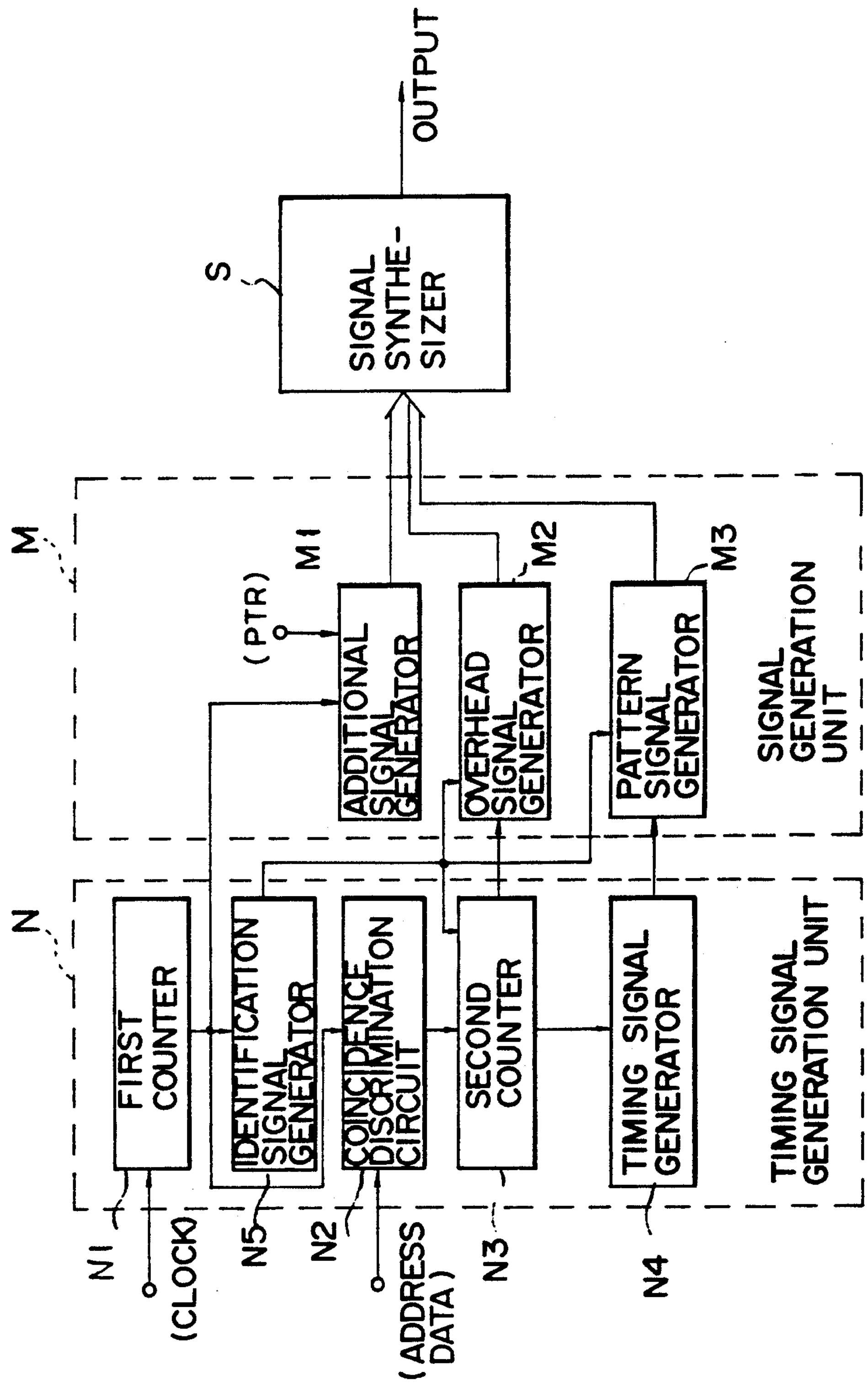
FIG. 19A is a block diagram showing a scheme of a signal generating apparatus according to the present invention using the synchronous transfer mode.
Figure 19B:
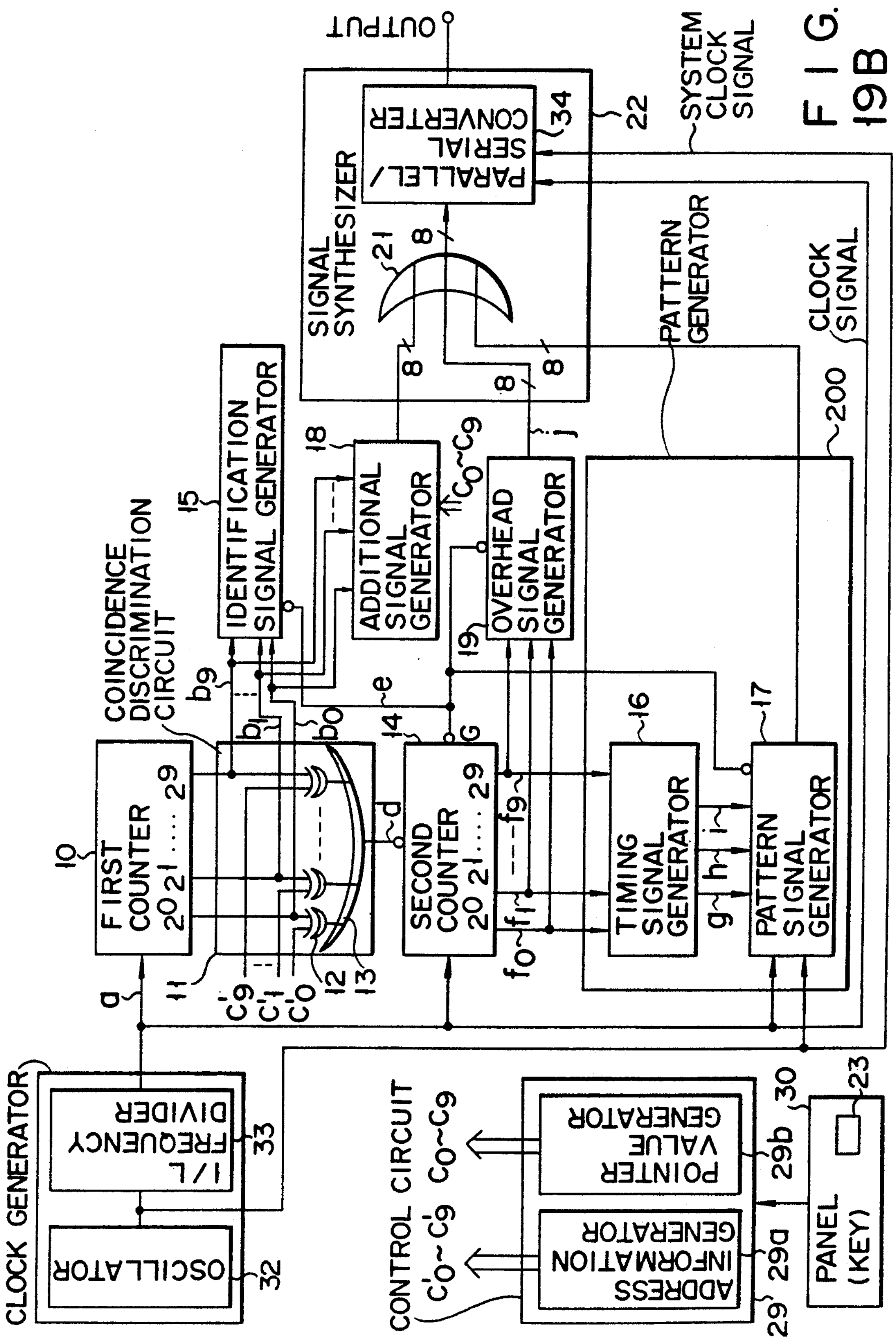
FIG. 19B is a block diagram showing the first embodiment according to the present invention.

Referring to FIG. 19B showing the first embodiment of the present invention, reference numeral 32 denotes an oscillator oscillated at a predetermined frequency (51.84 MHz in this embodiment); 33, a 1/L ($\frac{1}{8}$) frequency divider for generating a clock signal a having a frequency to be one period by L (8) clock bits.

Reference numeral 10 denotes a first counter for repeatedly counting the clock signal a every 810 signals (since 810 one-byte unit signals constitute one frame), and for outputting the count value during counting by a binary code.

FIG. 20 shows count values of the counter 10 corresponding to a format shown in FIG. 21 when an initial value of the counter 10 is zero. When the count values and the format in FIGS. 20 and 21 are compared with each other, a count value of zero corresponds to a signal A1, a count value of 273 corresponds to an address zero in an STS-1 Envelope Capacity, and the count value of 809 corresponds to an address 521.

Reference numeral 11 in FIG. 19B denotes a coincidence discrimination circuit for outputting a coincidence signal of "L" level when designation data ($C_0'$ to $C_9'$) input by a binary code from a control circuit and the count value from the first counter 10 coincide with each other. The coincidence discrimination circuit is constituted by ten exclusive OR circuits 12 and an OR circuit 13.

Figure 22:
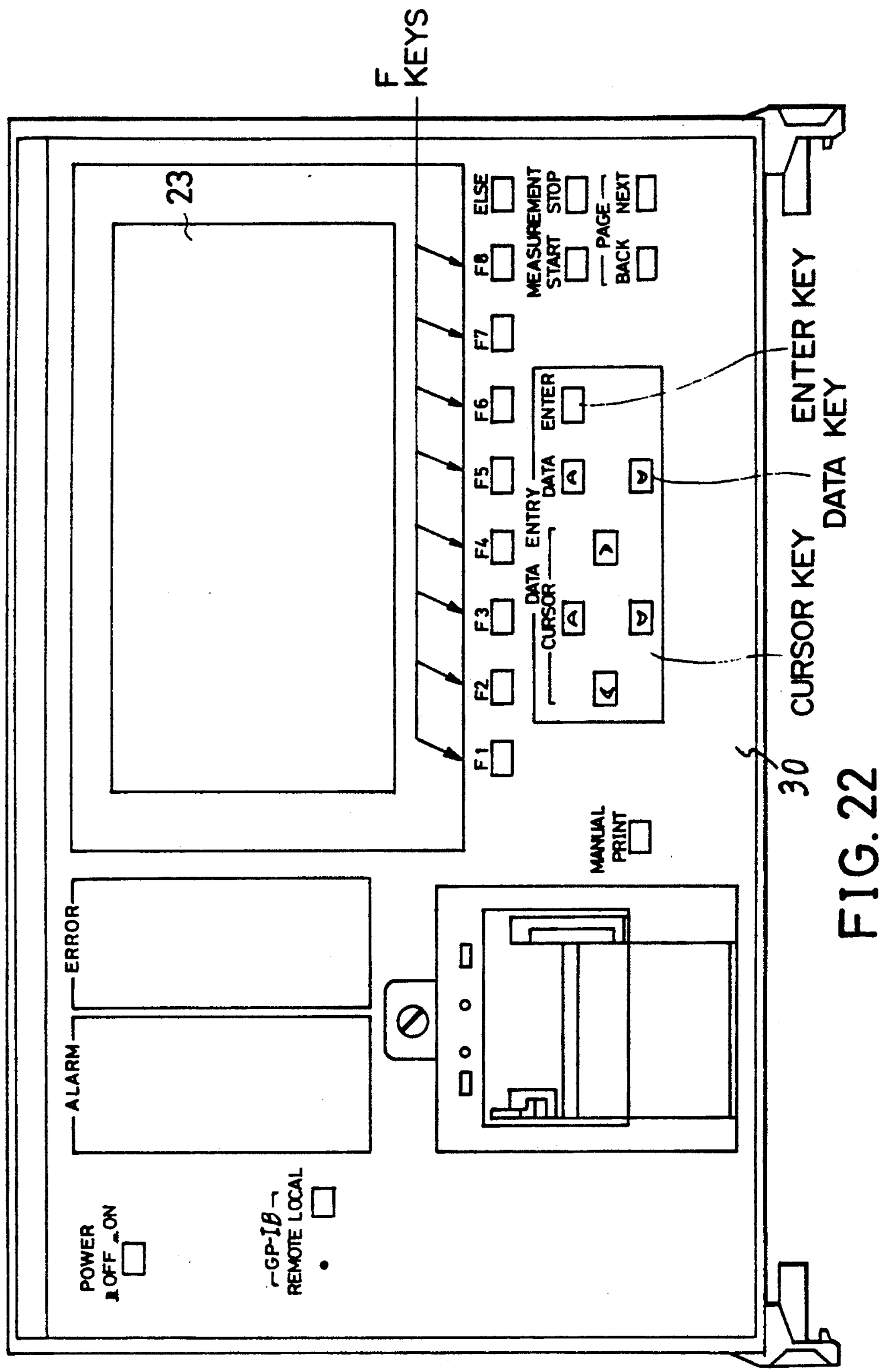
FIGS. 22 and 23 are views showing applications of key switches of a front panel and a display for setting address values $C_0'$ to $C_9'$ and pointer (PTR) values $C_0$ to C9 of FIG. 19B.
Figure 23:
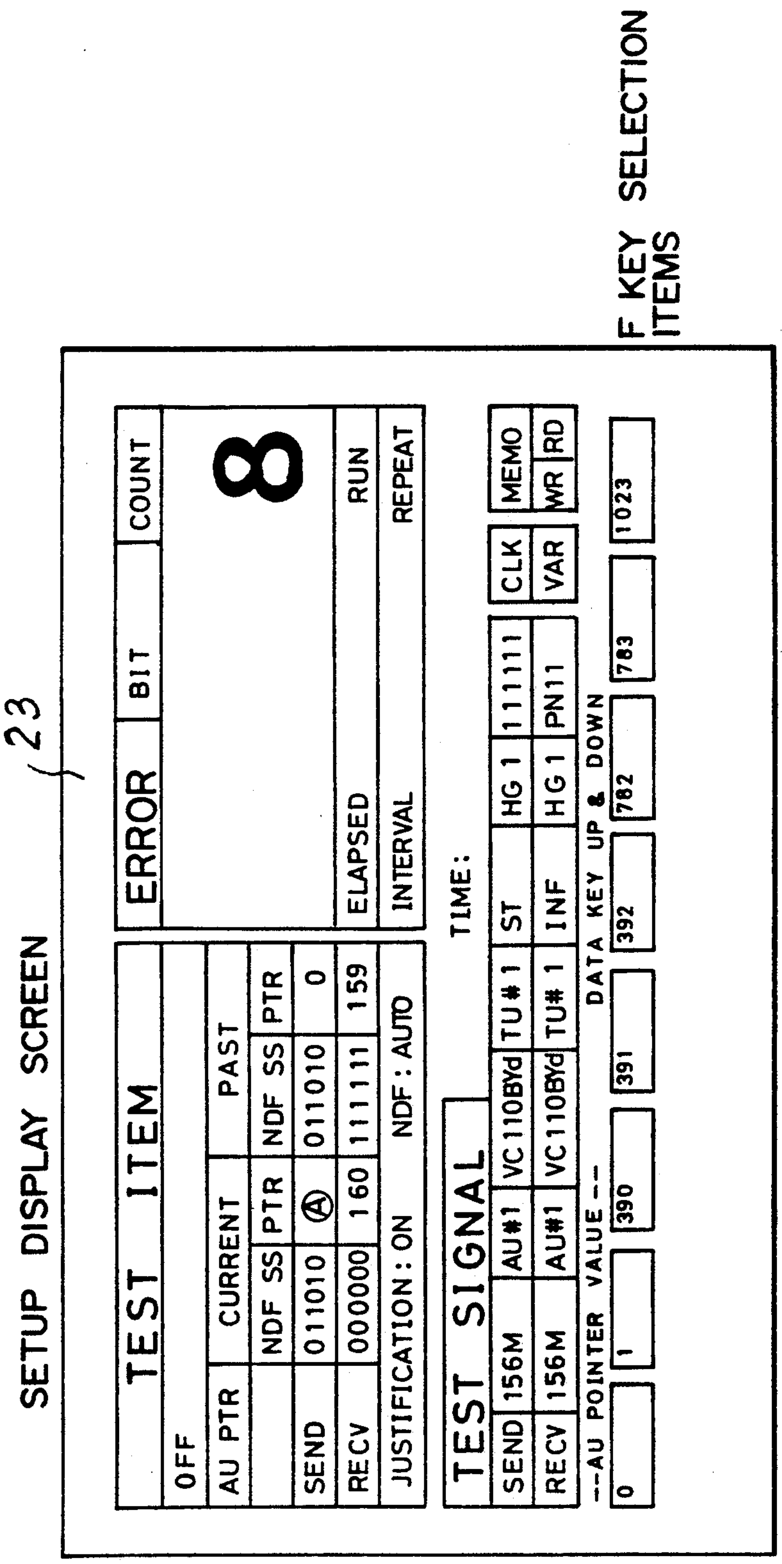

The designation data ($C_0'$ to $C_9'$) have a value shown in FIG. 20 corresponding to one of addresses 0 to 782 shown in FIG. 21, and are set by inputting a PTR value using a key switch 30 and a display 23 arranged on a front panel shown in FIGS. 22 and 23 by a sequence shown in FIG. 24 through an address information generator 29*a* of a control circuit 29. For example, when the PTR value set as described above is 1, a binary code of $C_0'$ to $C_9'$ output from the address information generator 29*a* represents 274.

In this case, the control circuit 29 comprises a pointer value generator 29*b* for setting the PTR value set as described above as the same value ($C_0$ to $C_9$) in an additional signal generator 18 (to be described later).

Referring to FIG. 19B, reference numeral 14 denotes a second counter for starting counting a clock signal from "0" upon reception of the coincidence signal from the coincidence discrimination circuit 11. The second counter 14 outputs a count value during counting in the form of the binary code ($f_0$ to $f_9$).

A gate terminal G is arranged in the second counter 14. While the gate terminal G is at "H" level, counting of a clock signal is inhibited, and the count value is held.

Figure 25:
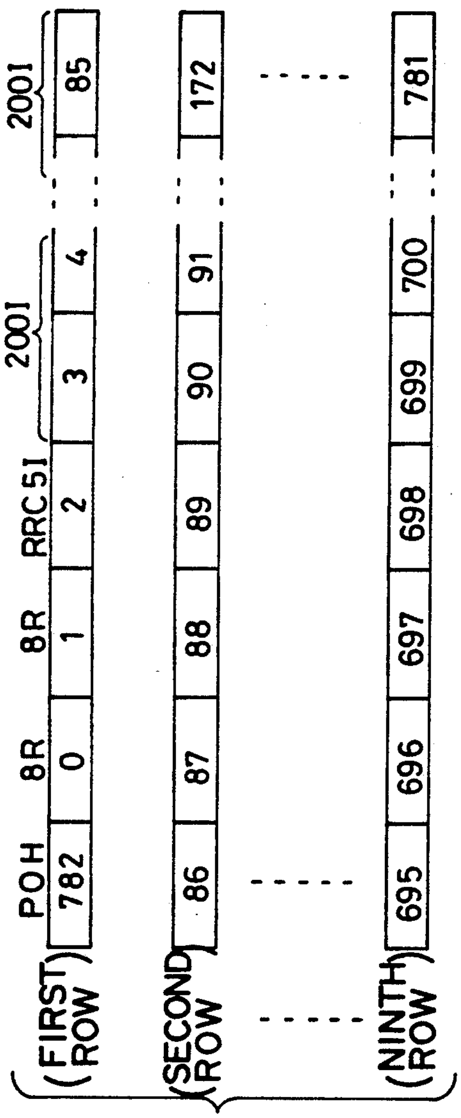
FIG. 25 is a view showing a content of a count value of a second counter of FIG. 19B.
Figure 26:
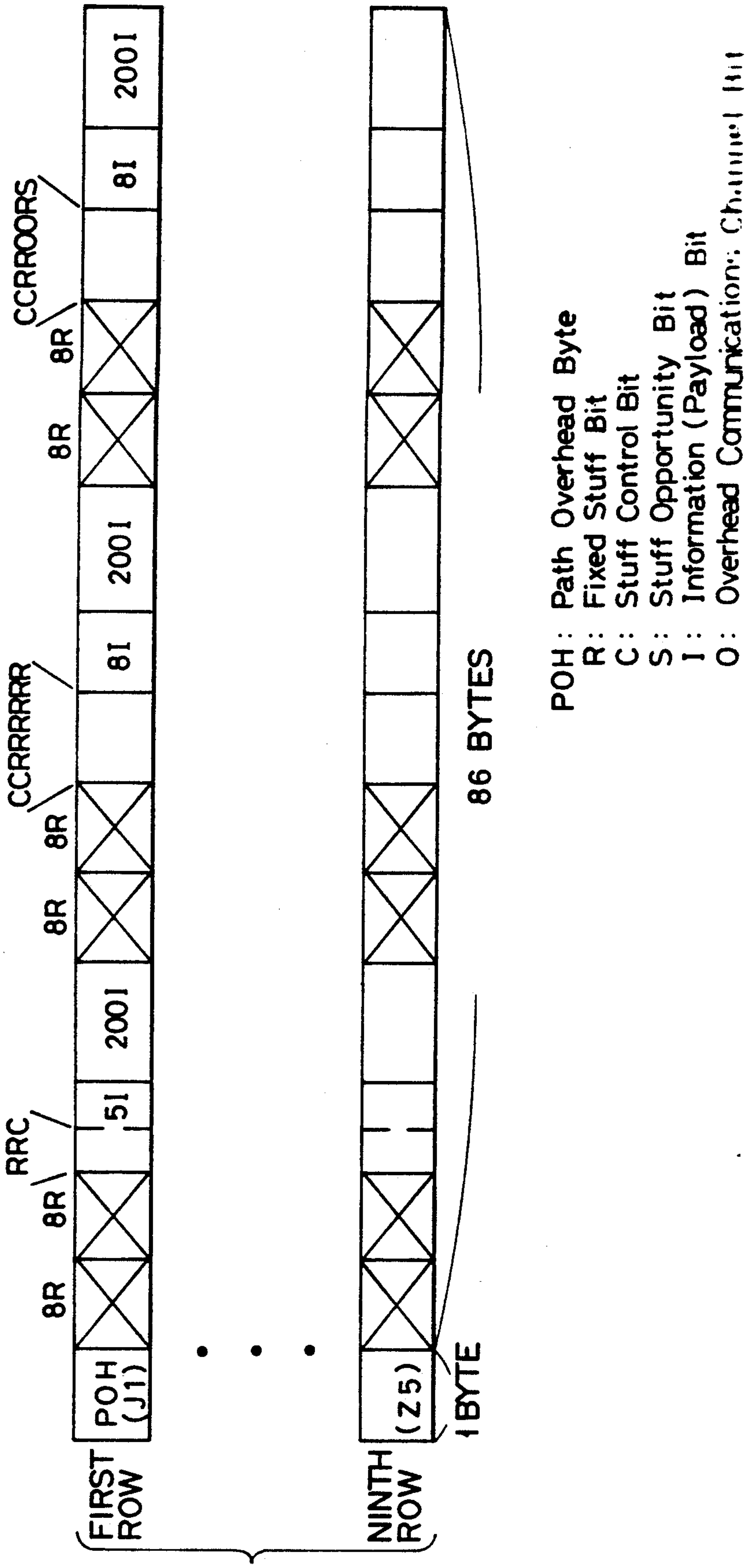
FIG. 26 is a view showing a format corresponding to FIG. 25.

FIG. 25 shows count values corresponding to a format shown in FIG. 26 when the initial value of the second counter 14 is zero. When the count values and the format in FIGS. 25 and 26 are compared with each other, a count value of 782 corresponds to a POH of a first row, and a count value of 2 corresponds to a byte containing 5I of the first row.

Referring to FIG. 19B, reference numeral 15 denotes an identification signal generator for outputting a gate signal of "H" level while the count value from the first counter 10 is in a TOH (Transport Overhead). The identification signal generator 15 can be realized by using a memory. In this case, when an input value becomes a value shown in FIG. 20 corresponding to a position of the TOH shown in FIG. 21, a predetermined gate signal can be obtained by operating the memory to cause the output from the memory to be "H".

Figure 3:
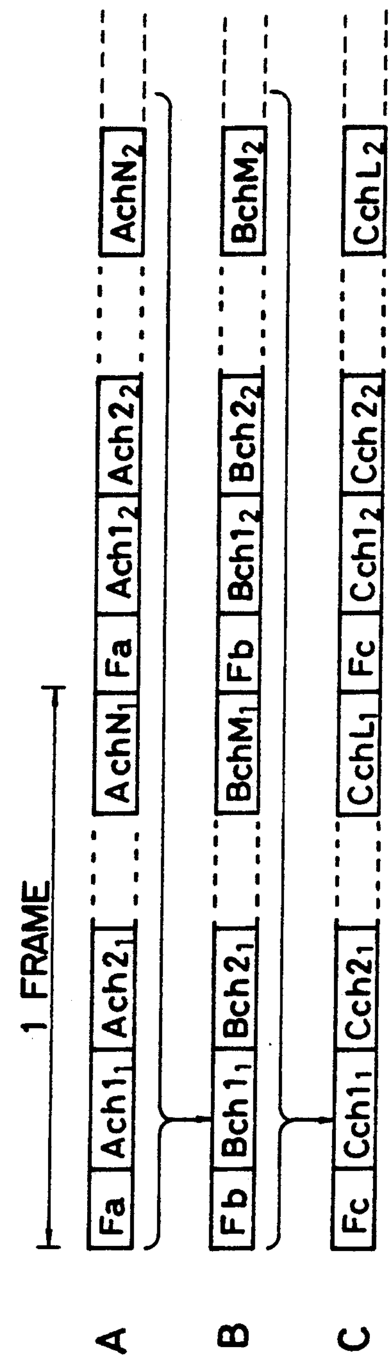
FIG. 3 is a view showing the multiplexed signal according to the arrangement shown in FIG. 2.
Figure 4:
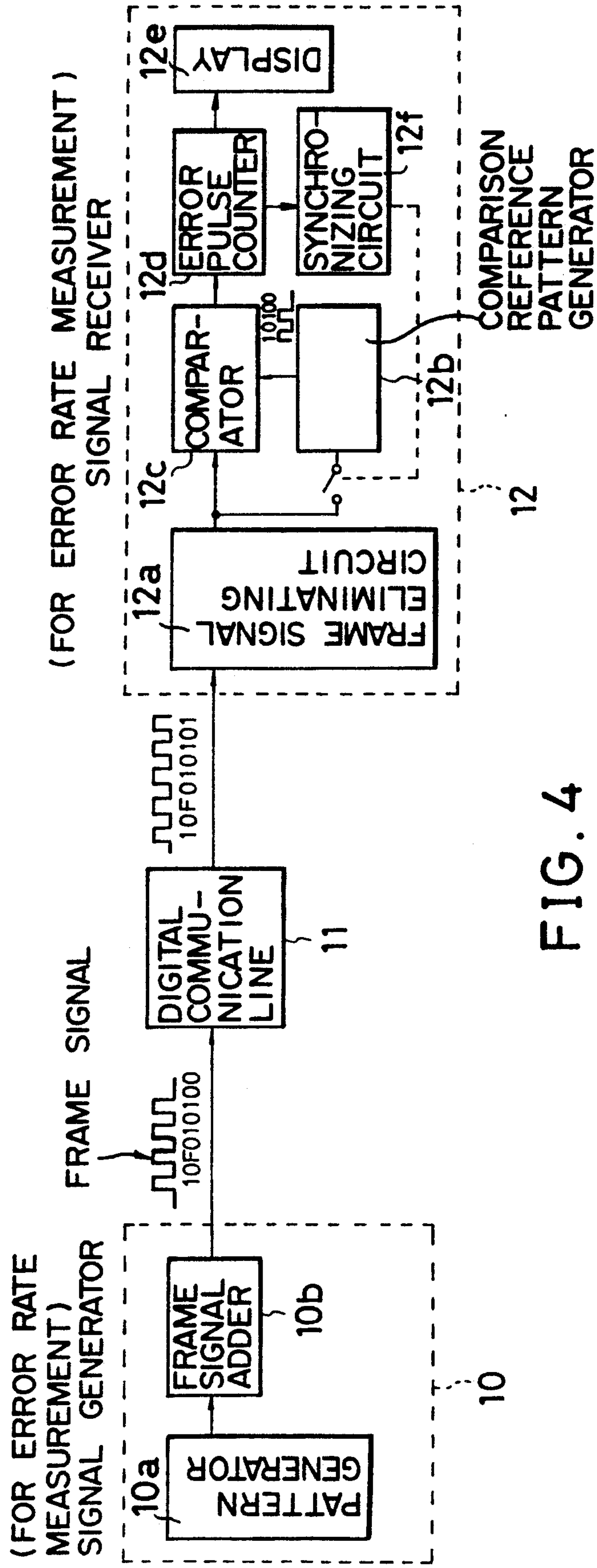
FIG. 4 is a block diagram showing a transmission/-reception system for measuring an error rate of a digital communication line according to the mode shown in FIG. 1.
Figure 5:
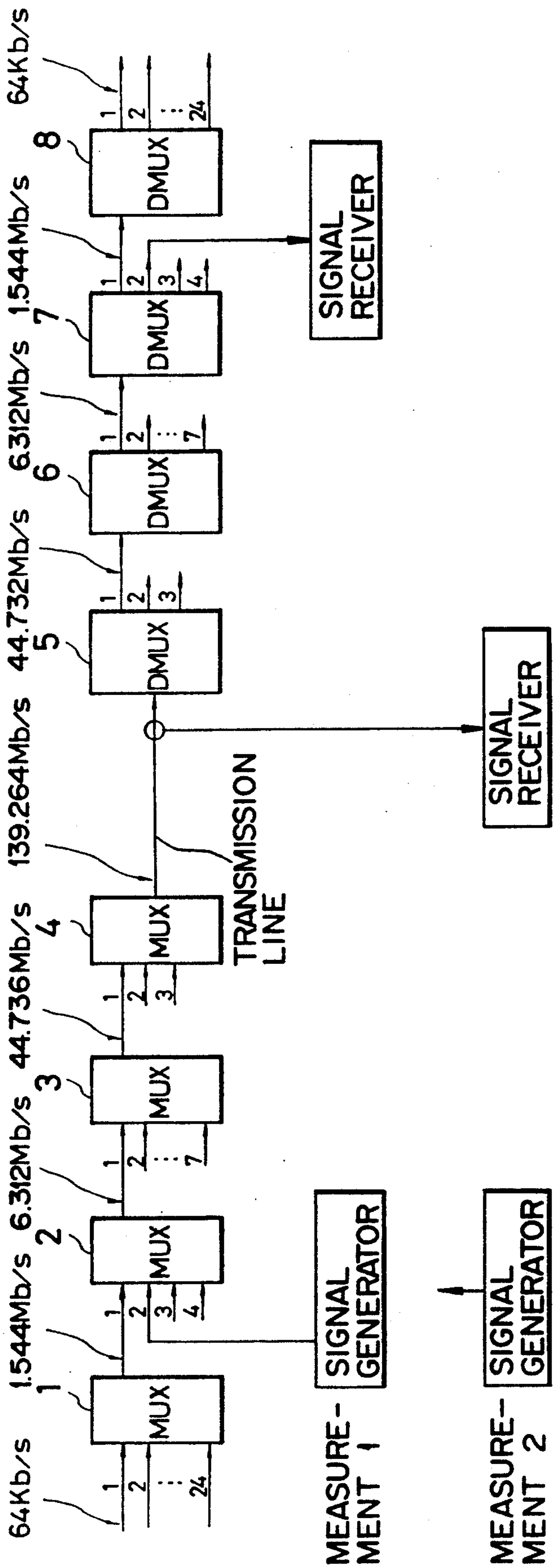
FIG. 5 is a view showing a concept for measuring an error rate of a digital communication line shown in FIG. 1.
Figures 6, 7, 9:
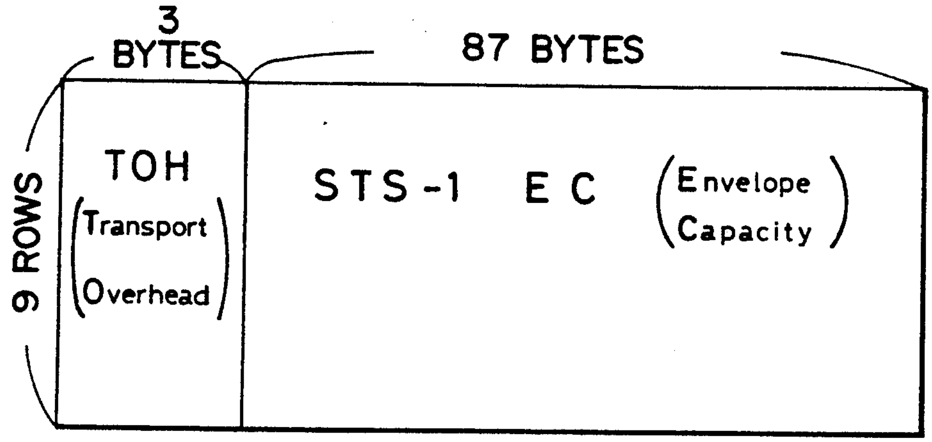
FIG. 6 is a view for showing a basic frame arrangement of an SONET which is a new type of synchronous transfer mode.
FIG. 7 is a view showing a content of a TOH portion shown in FIG. 6.
FIG. 9 is a view showing a content of a POH portion shown in FIG. 8.
Figure 8:
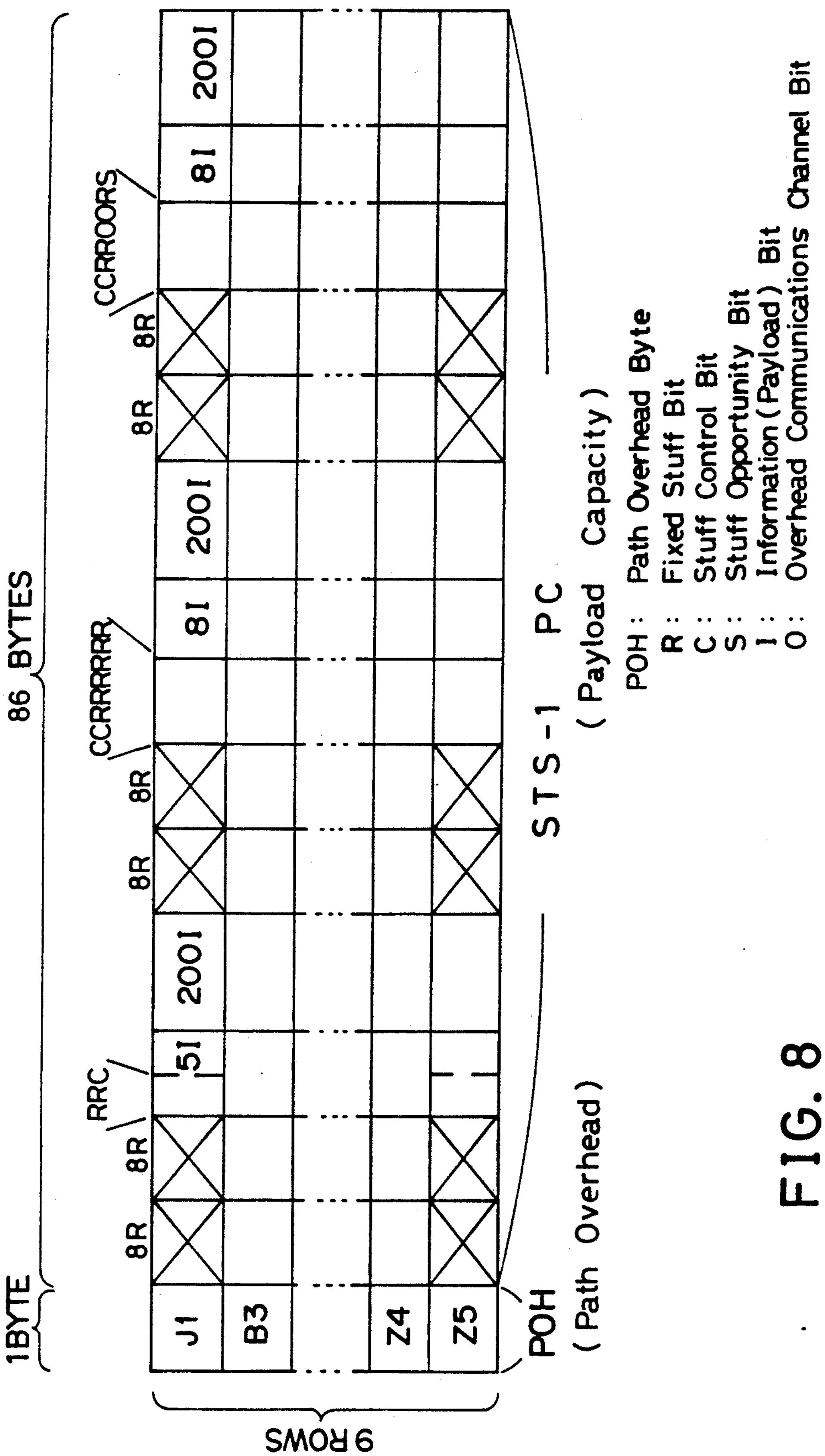
FIG. 8 is a view showing a content of an STS-1 EC portion shown in FIG. 6.
Figure 12:
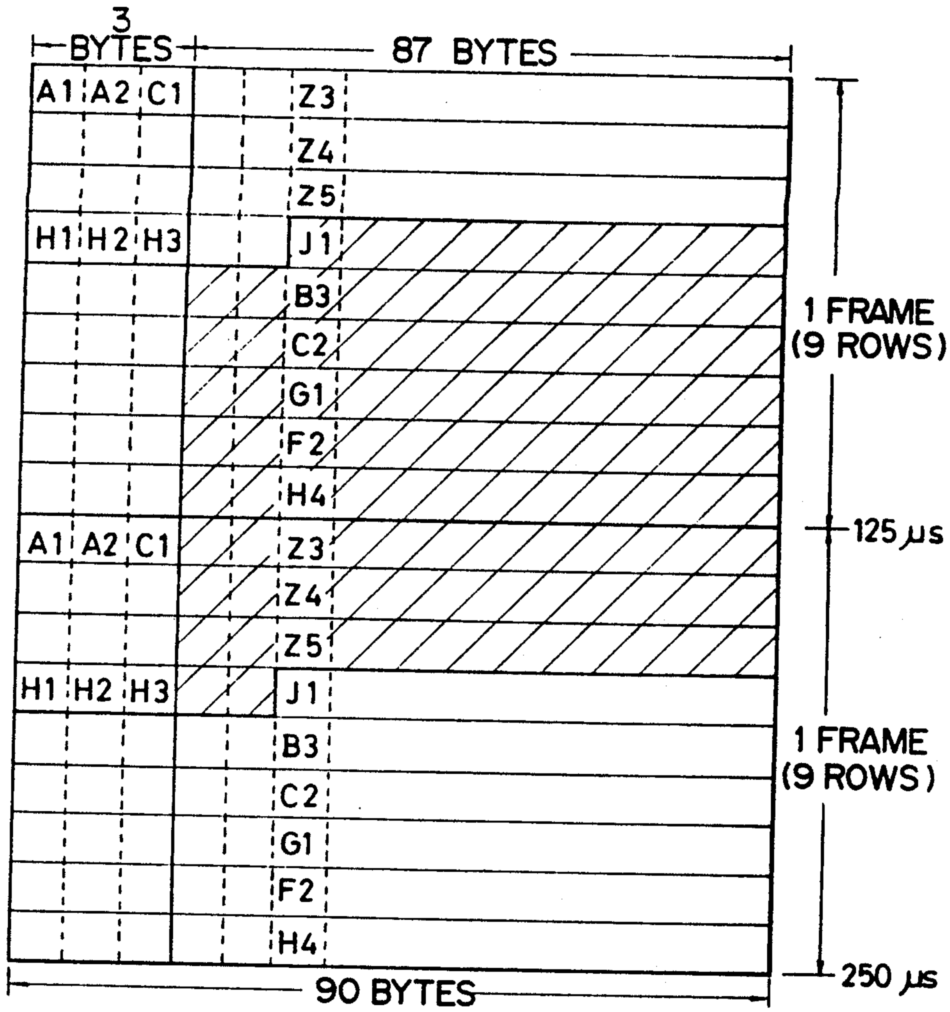
FIG. 12 is a view showing an example of a format in which a signal string is contained in the frame of FIG. 6.
Figure 14:
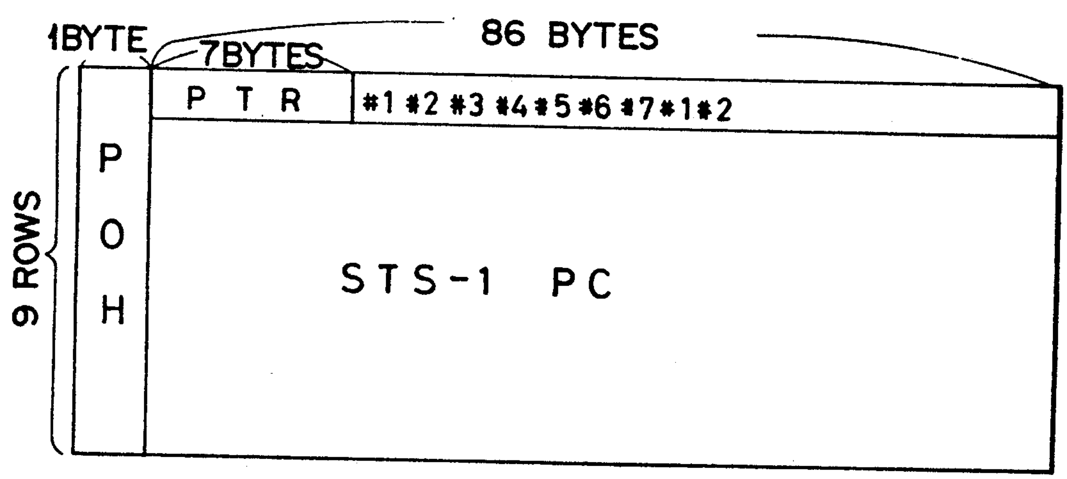
Figure 27:
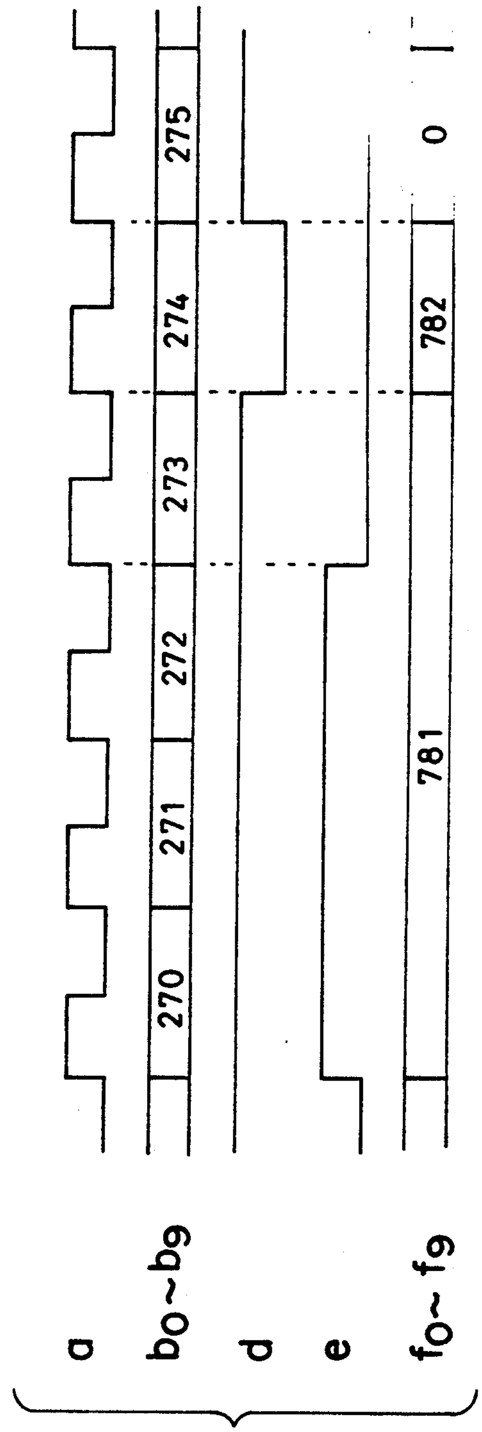
FIG. 27 is a timing chart showing a timing relationship of input/output sections of the second counter and an identification signal generator of FIG. 19B.

An example of a timing relationship of input/output sections of the second counter 14 and the identification signal generator 15 when PTR=1 is shown in FIG. 27. Referring to FIG. 27, reference symbol a denotes a clock signal output from the 1/L frequency divider 33 shown in FIG. 19B; $b_0$ to $b_9$, a count value of an output from the first counter 10; d, a coincidence signal from the coincidence discrimination circuit 11 when PTR=1; e, a gate signal from the identification signal generator 15 for inhibiting counting of the second counter 14 while the TOH shown in FIG. 3; and $f_0$ to $f_9$, a count value of an output from the second counter 14.

Reference numeral 16 denotes a timing signal generator for outputting a timing signal corresponding to a specific signal every time the count value from the second counter 14 coincides with a predetermined fixed value with respect to the specific signal. In this embodiment, as the above-described specific signal, a signal (g) to be "H" every byte including information I shown in FIG. 26, a signal (h) to be "H" every byte including 5I, and a signal (i) to be "H" every byte including information I in a stuff S are used. Note that, in this embodiment, information portions are respectively inserted in the stuff S portions of only first to third rows. The timing signal generator 16 can be realized by using a memory as the identification signal generator 15.

Figure 19C:
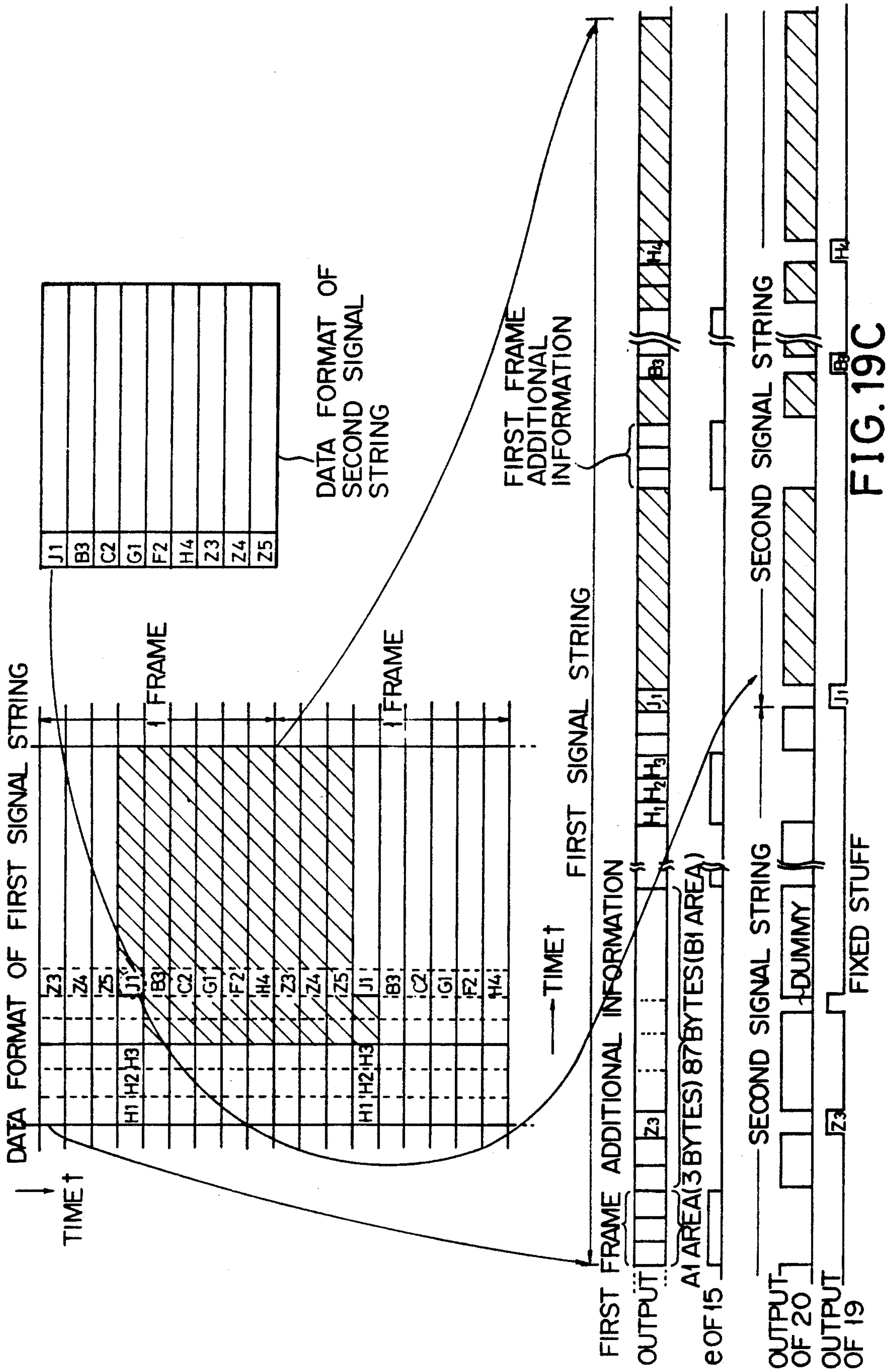
FIG. 19C is a schematic view showing signal string generation in FIG. 19B.

FIG. 19C is a schematic view showing generation of a signal string in FIG. 19B.

Referring to FIG. 19B, reference numeral 17 denotes a pattern signal generator for receiving the output from the oscillator 32, the clock signal from the 1/L frequency divider 33, the output from the identification signal generator 15, and the specific signals (g), (h), and (i) from the timing signal generator 16 to generate a test signal for a test. An example of the pattern signal generator 17 is shown in FIG. 28 and a timing relationship of signals ① to ⑦ of the respective parts each part in FIG. 28 is shown in FIG. 29.

Figure 29:
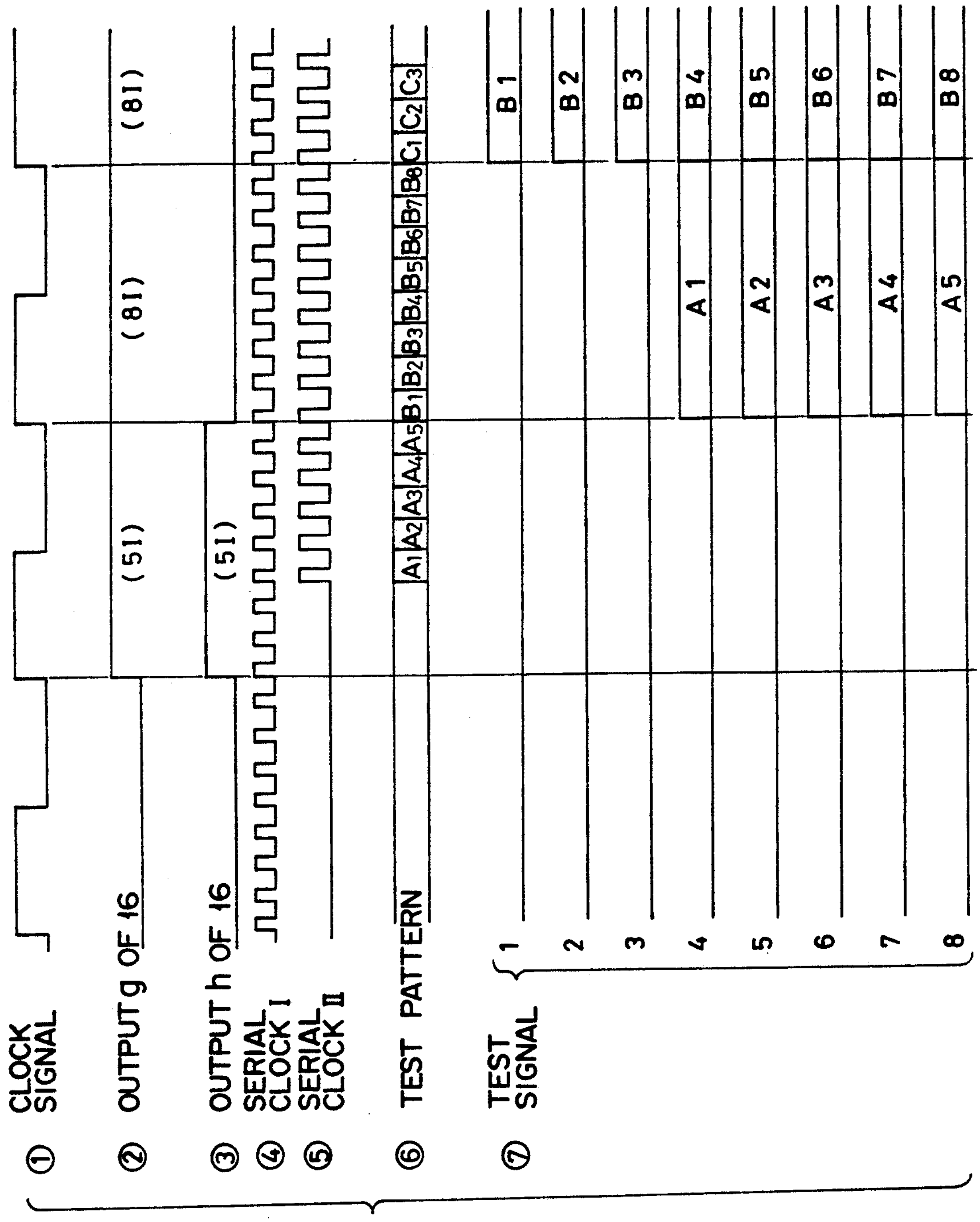

A serial clock I shown in ④ of FIG. 29 is an output (system clock) from the oscillator 32 in FIG. 19B. A serial clock II shown in ⑤ of FIG. 29 can be obtained from the serial clock I by generating signals having clock counts per byte as one (1I), five (5I), and eight (8I), and switching over these signals by the signals (g, h, i) from the timing signal generator 16.

Figure 28:
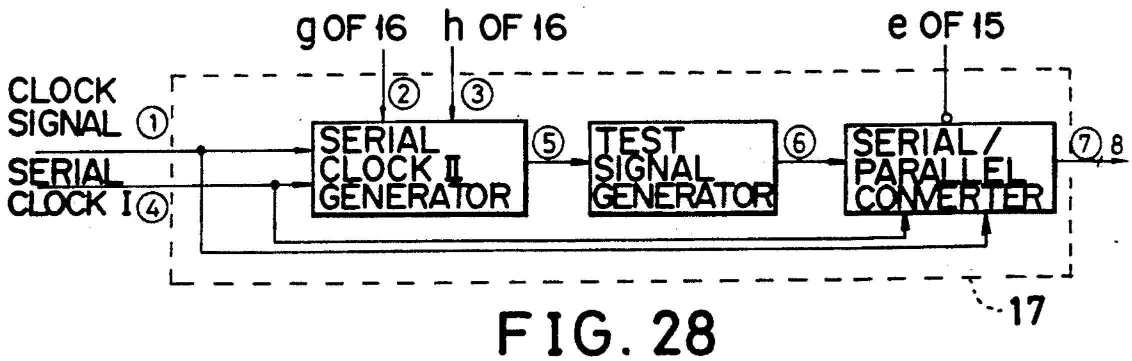
FIGS. 28 and 29 are a block diagram showing an example of a pattern signal generator of FIG. 19B and a view showing a timing relationship thereof.

Referring to FIG. 28, the test signal pattern generator for generating a test signal can be constituted by a circuit complying with CCITT Rec. 0.151.

The output ⑥ from the test signal pattern generator is serial/parallel-converted, set at "L" level except for a predetermined position (bit having the information I shown in FIG. 26), and becomes an output from the test signal pattern generator 17.

The additional signal generator 18 in FIG. 19B generates a TOH signal shown in FIG. 21. $C_0$ to $C_9$ input to the additional signal generator 18 are bits of a 10-bit binary code representing a PTR value, and are inserted in a PTR portion shown in FIG. 11. The setting of $C_0$ to $C_9$ is the same as described above.

Note that an output from the additional signal generator 18 is set at "L" level except for a position of the TOH signal shown in FIG. 21.

An overhead signal generator 19 in FIG. 19B sets a signal except for the information I shown in FIG. 26. An output from the overhead signal generator 19 is set at "L" level at the information I bit position in FIG. 26.

Note that a function of the gate terminal of the overhead signal generator 19 is as follows.

Figure 30:
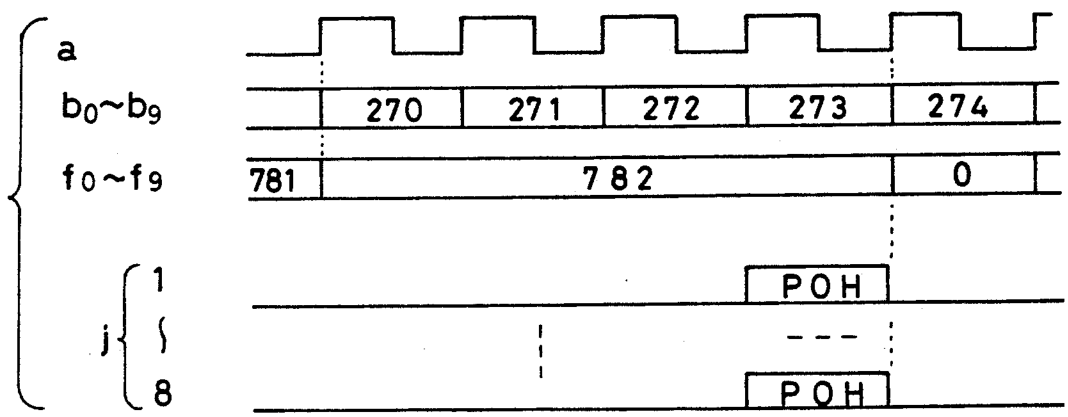
FIG. 30 is a timing chart showing a part of FIG. 27 when PTR=0.

FIG. 30 shows a part of FIG. 27 when PTR=0. In the timing signal generator 16, since the count value of 782 of the second counter 14 is caused to correspond to the POH, when PTR=0, the POH becomes a 4-byte signal. Count values of 270, 271, and 272 of the first counter 10 are caused to correspond to the TOH in the first counter 10. In this state, two signals are synchronized in a synthesizer 21.

An output e from the identification signal generator 15 is used for causing the POH in FIG. 30 to be one byte for the purpose of avoiding this overlapping (j).

In the test signal pattern generator 17, the output signal from the test signal pattern generator 17 is delayed by one byte from the corresponding input signal. Compensation of this delay is performed by delaying each of the additional signal generator 18 and the overhead signal generator 19 by one byte, or advancing an output from the timing signal generator 16 by one byte.

Outputs from the additional signal generator 18, the overhead signal generator 19, and the pattern signal generator 17 are synthesized by the synthesizer (OR circuit) 21, and a synthesized signal is output to a parallel/serial converter 34.

Note that, as described above, the control circuit 29 includes a circuit for setting $C_0$ to $C_9$, and $C_0'$ to $C_9'$, a circuit for controlling each key switch 30 of the front panel, a circuit for controlling the screen of the display 23, a memory for storing a program for operating a CPU for controlling the entire control circuit 29 and a conversion table of $C_0$ to $C_9$ and $C_0'$ to $C_9'$, a memory for temporary holding a PTR value input from the key switch 30, and the like.

In the above-described first embodiment, the initial value of the first counter 10 is set to be zero. This value, however, can be set to be another value. For example, the initial and final values can be respectively set to be 214 and 1,023. In addition, when the regularity of a format to be generated is taken into consideration, the first counter 10 can be constituted by two counters, for example, counters of 0 to 89 and 0 to 8. The former indicates each signal position in one row, and the later indicates discrimination of the first to ninth rows. According to this embodiment, the number of the outputs from the first counter increases to be 11, and this increase is useful for a case to be described later.

In addition, in this embodiment, the count values of 0, 1 and 2 of the first counter are caused to correspond to the TOH of the first row. Other values, e.g., 809, 0, and 1 can be caused to correspond to the TOH of the first row.

The above-described fact is applicable to the second counter 14.

Figure 31:
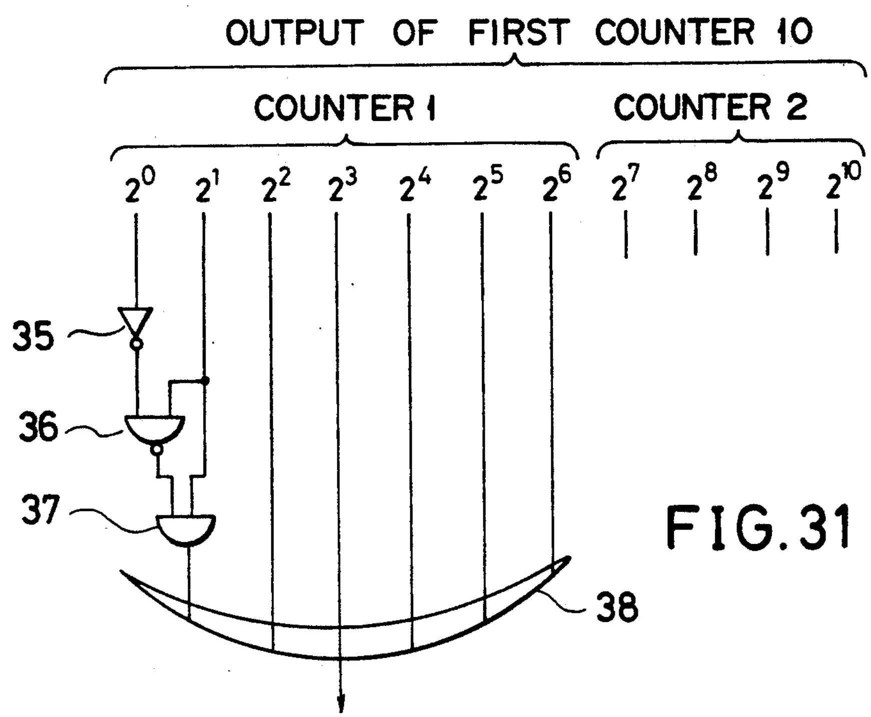
FIG. 31 is a diagram of a main part showing an example of the identification signal generator of FIG. 19B.

The identification signal generator 15 can be realized by a combination of gates in place of the memory. For example, when the first counter 10 is constituted by the two counters as described above, the TOH is always 0, 1, and 2. As a result, the identification signal generator 15 may be made by an arrangement shown in FIG. 31. Referring to FIG. 31, reference numeral 35 denotes an inverter; 36, a NAND gate; 37, an AND gate; and 38, an OR gate. This arrangement is useful when the present invention is realized by an ASIC without a memory. The above-described arrangement can be applied to the timing signal generator 16.

Second Embodiment

Figure 32A:
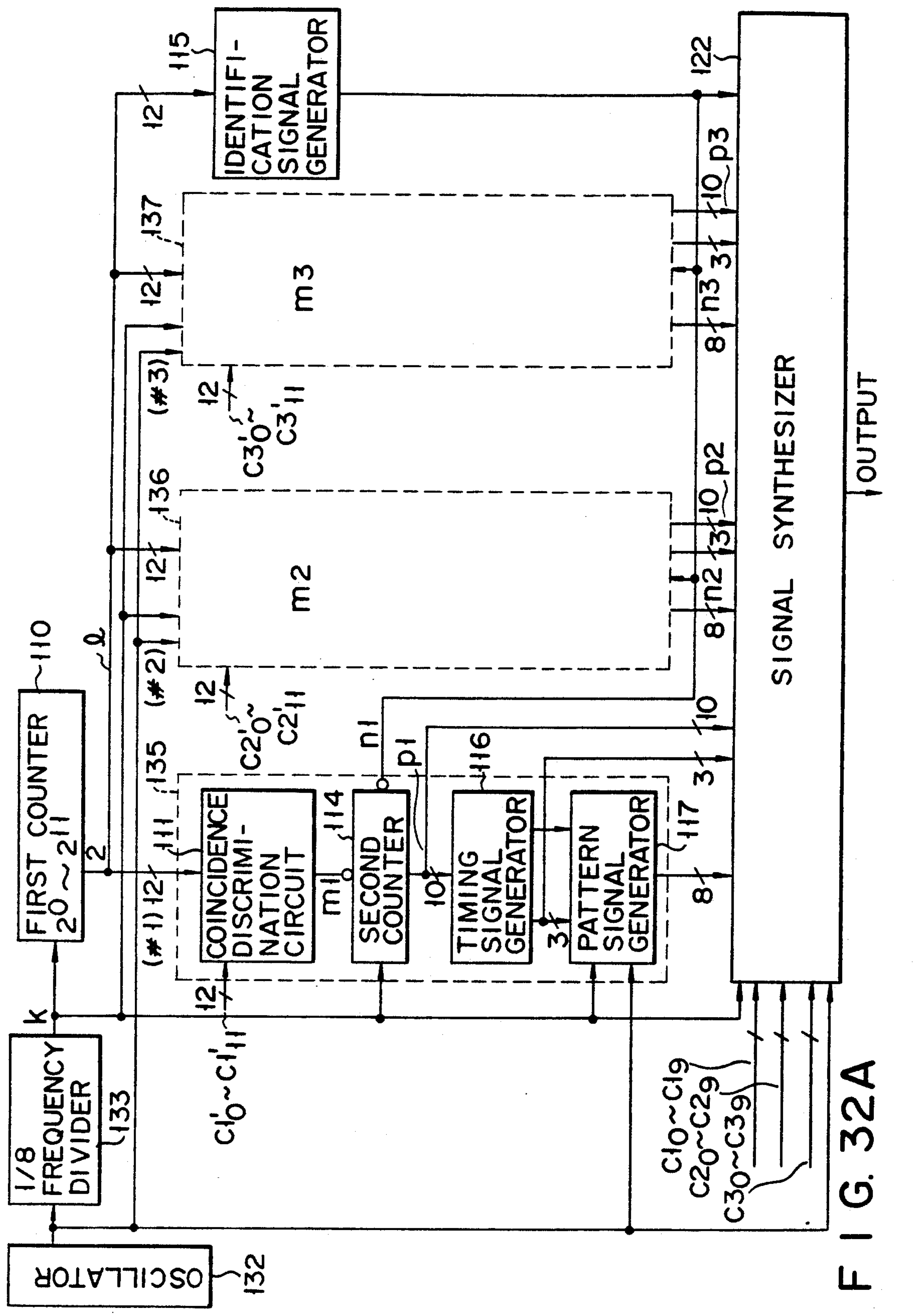

Operation of Containing Three 44.736-Mb/s Signals in 155.52-Mb/s Signal String In comparison of FIGS. 32A and 32B showing the second embodiment with FIG. 19B showing the first embodiment, circuits 133 and 33, 110 and 10, 111 and 11, 114 and 14, 115 and 15, 116 and 16, and 117 and 17 respectively have the identical functions. Differences between them are as follows.

Referring to FIGS. 32A and 32B, reference numeral 132 denote an oscillator having a frequency of 155.52 MHz.

The first counter 110 in FIGS. 32A and 32B repeats counting every 2,430 clock signals (an output from the $\frac{1}{3}$ frequency divider 133) (since the 2,430 one-byte unit signals constitute one frame).

Figure 33:
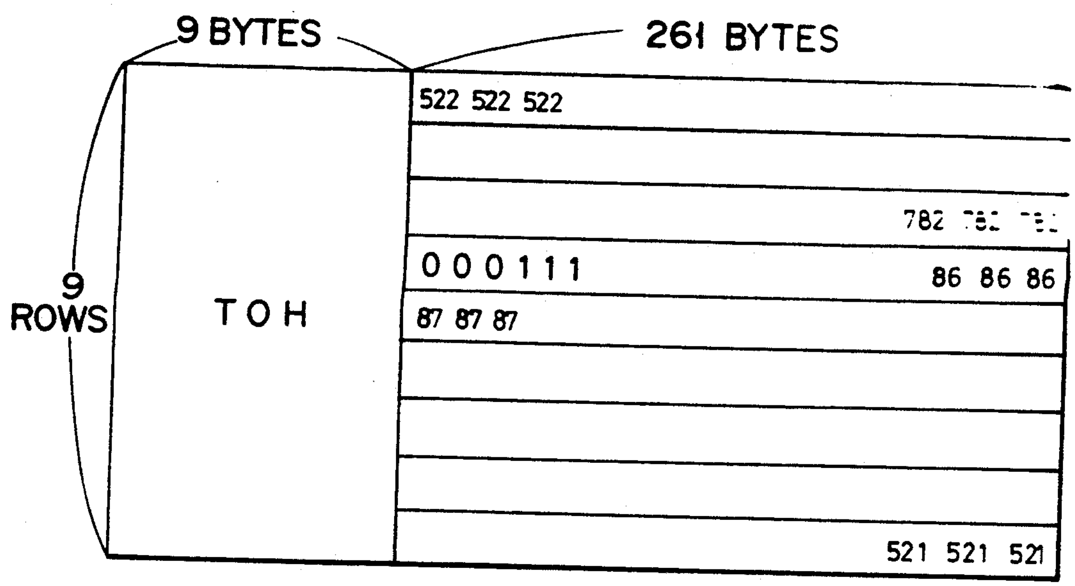
FIG. 33 is a view showing a frame format of FIGS. 32A and 32B.
Figure 34:
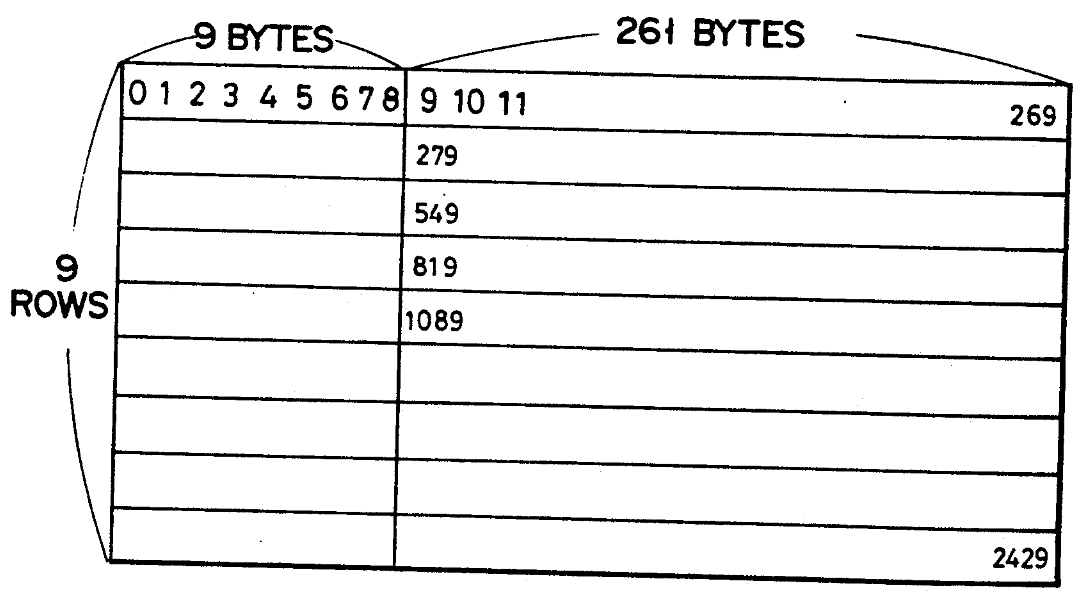
FIG. 34 is a view showing an output from a first counter of FIGS. 32A and 32B corresponding to FIG. 33.

A frame format of this embodiment is shown in FIG. 33. FIG. 34 shows a binary code of the output from the first counter 110 in correspondence with FIG. 33.

In order to cause three signals (to be described later) to have the same PTR region, there are three count values corresponding to the same PTR value. A correspondence between the PTR value and $C1_0'$ to $C1_{11}'$, $C2_0'$ to $C2_{11}'$ or $C3_0'$ to $C3_{11}'$ will be described later.

An generator 135 in FIGS. 32A and 32B generates one of the three signals (to be referred to as #1 hereinafter) shown in FIG. 26. Generators 136 and 137 for respectively generating the signals #2 and #3 also generate these two signals with the same arrangement.

The second counter 114 covers the signal string (783 bytes) shown in FIG. 26.

Figure 35:
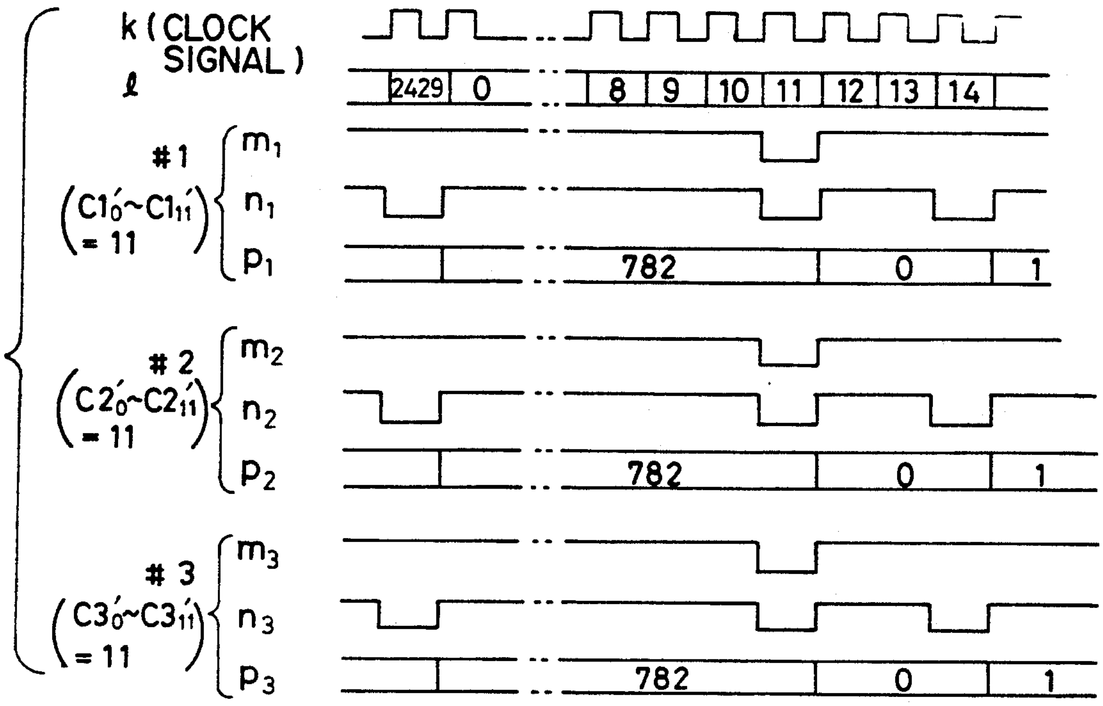
FIG. 35 is a timing chart showing a timing relationship of input/output sections of a coincidence discrimination circuit and a second counter of each generator of FIGS. 32A and 32B.

The timing relationship between the coincidence discrimination circuit 111 in the generators 135, 136 and 137 shown in FIGS. 32A and 32B, and an input/output section of the second counter 114 is shown in FIG. 35.

Referring to FIG. 35, reference symbol k denotes a clock signal of the output from the circuit 133; l, an output from the first counter 110; m, n, and p, respectively, an output from the coincidence discrimination circuit 111, a gate signal input to the second counter 114, and an output from the second counter 114. Suffixes m, n, and p respectively indicate #1, #2, and #3.

FIG. 35 shows a timing chart when PTR=522.

Figure 36:
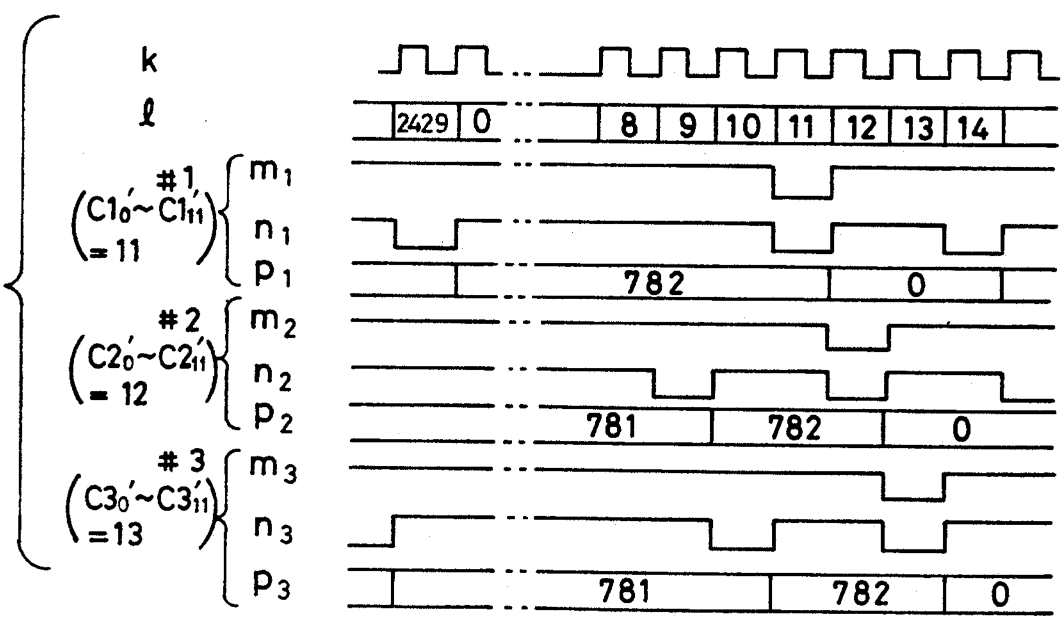
FIG. 36 is a view showing necessity of a change in gate signal when PTR values are different in FIG. 35.

In FIG. 35, $CN_0'$ to $CN_{11}'$ (N=1, 2, 3) are kept unchanged when PTR value is a predetermined value. $CN_0'$ to $CN_{11}'$ can be set to be different values, as shown in FIG. 36. In this case, it is required to change the gate signal inputs ($n_1$, $n_2$, and $n_3$), as shown in FIG. 36.

One of the gate signal inputs ($n_1$, $n_2$, and $n_3$) becomes "L" level every three clock signals in the portion except for an SOH and the PTR. A one-byte width of the portion of the output from the second counter 114, therefore, is of three clock signals.

The signal synthesizer 122 can synthesize signals using the same arrangement as that of the first embodiment.

$C1_0$ to $C1_9$, $C2_0$ to $C2_9$, and $C3_0$ to $C3_9$ in FIGS. 32A and 32B are the PTR values of #1, #2, and #3.

Note that a # circuit receiving no test signal (135, 136, and 137 in FIGS. 32A and 32B) can be omitted. In this case, a dummy signal in place of the additional signal and the test signal can be generated by the signal synthesizer 122.

Third Embodiment

Operation of Containing Seven 6.312-Mb/s Signals in 51.84-Mb/s Signal String Referring to FIGS. 37A and 37B showing the third embodiment, circuits 32, 33, 10, 11, 14, 15 and 34 can be realized by the circuits of the same reference numerals in FIG. 19B showing the first embodiment.

Figure 15:
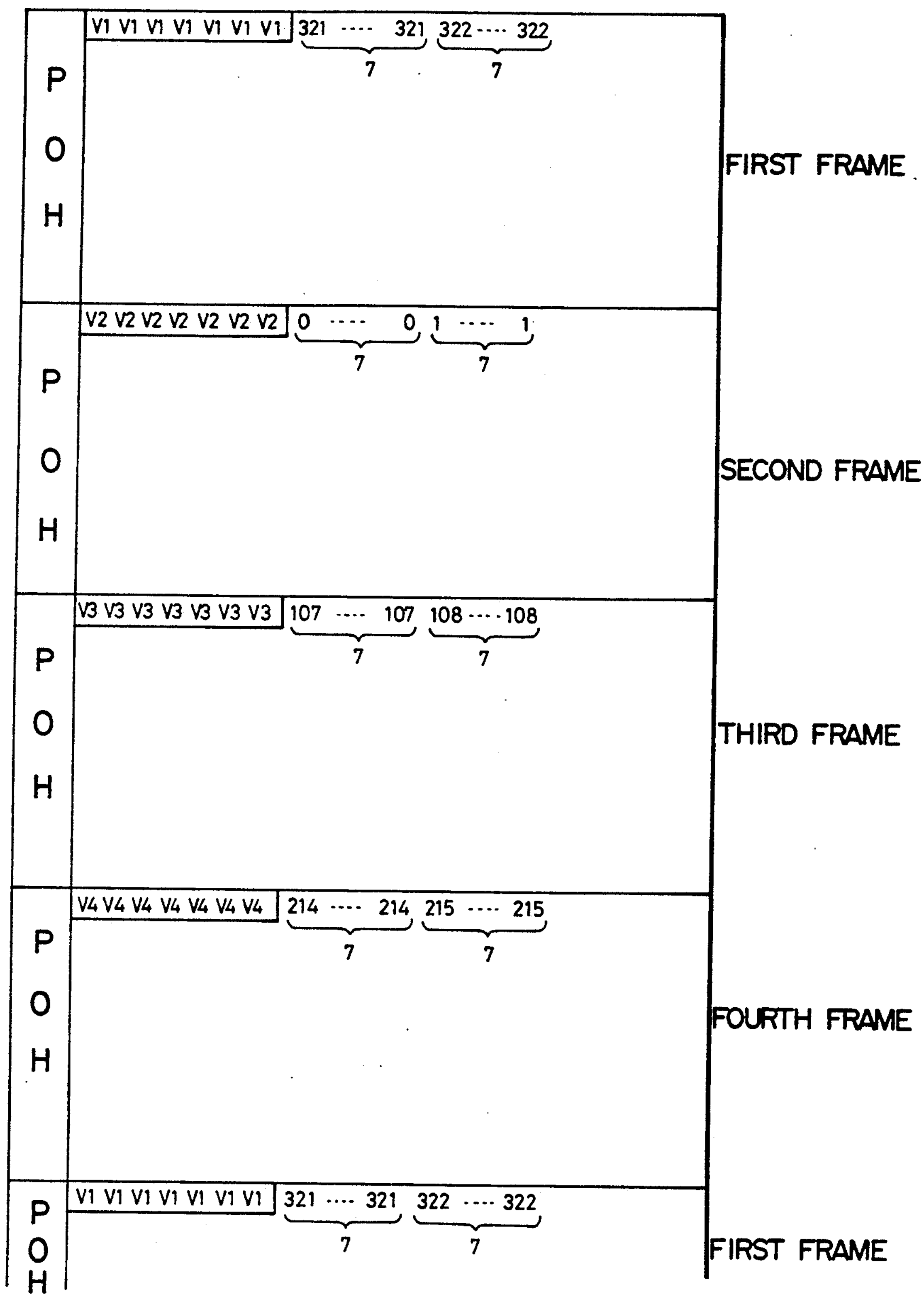
FIG. 15 is a view showing addressing of the signal strings of FIGS. 13 and 14.
Figures 16, 17:
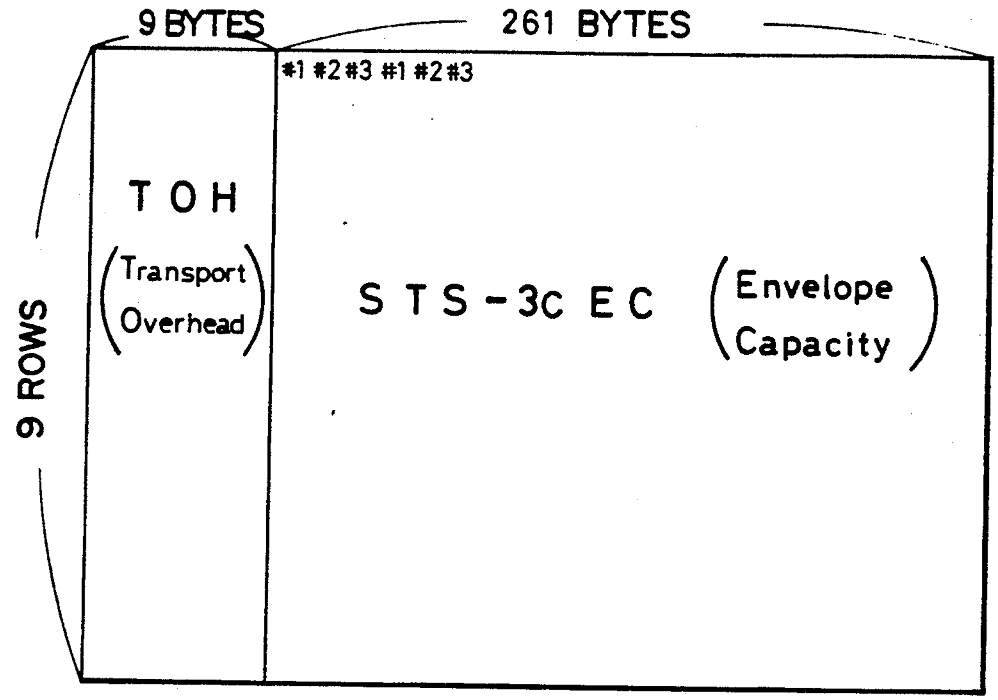
FIG. 16 is a view showing a frame structure when an STS-1 EC3 signal is contained.
FIG. 17 is a view showing a content of the TOH of FIG. 16.
Figure 18:
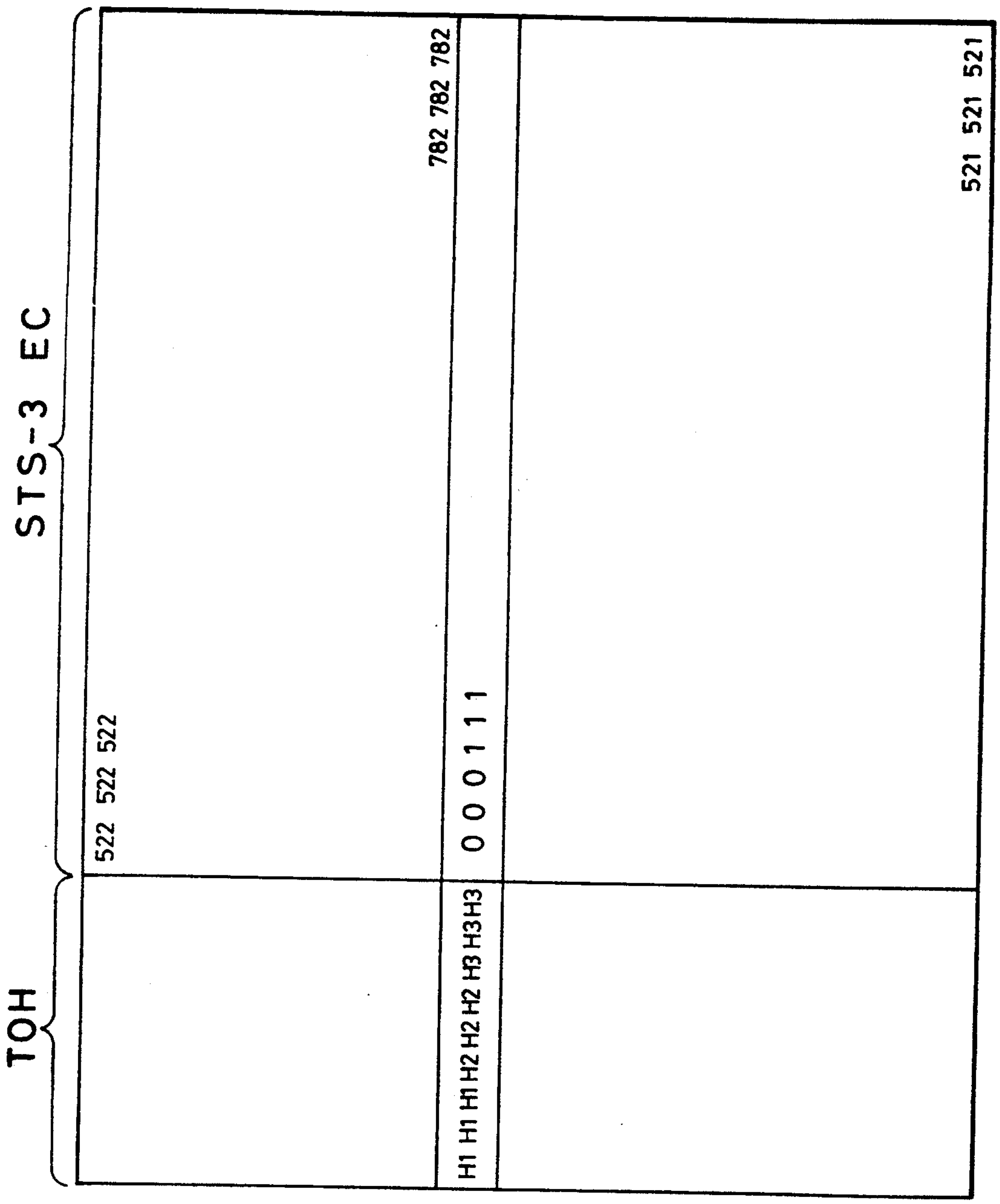
FIG. 18 is a view showing addressing in an STS-3c EC portion of FIG. 16.

Reference numeral 211 in FIG. 37A denotes a second coincidence discrimination circuit for performing the same operation as the coincidence discrimination circuit 111 in FIG. 32A showing the second embodiment. That is, $C1_0$, to $C1_{11}$, of the coincidence discrimination circuit 111 can have three values for the same PTR value. $C1_0$, to $C1_9$, of the second coincidence discrimination circuit 211 of the third embodiment can have seven values for the same PTR value (see FIG. 15).

The PTR value of 6.312 Mb/s is contained in four frames (FIG. 13). $C1_0'$ to $C1_9'$ are set to be a value within one frame. For example, when the PTR values are 321, 107, and 214, a count value of the second counter 14 corresponding to all 0s is set.

The second coincidence discrimination circuit 211, therefore, outputs a coincidence signal every frame.

A third counter 212 performs counting of 428 bytes of four frames shown in FIG. 13 The third counter 212 is reset every four frames by the coincidence signal to be initial value of 0.

A timing signal generator 214 receives the count value and outputs a first signal to be "H" level every byte containing information on the basis of FIG. 13, and second, third and fourth signals, pieces of information per byte of which are respectively corresponded to seven, one, and three bytes. Note that the third signal, information of which is corresponded to one byte, is also output when a byte in which S1 and S2 in FIG. 13 respectively contain a dummy and the information (set values in this embodiment). The first, second, third, and fourth signals are output to a signal synthesizer 218.

A pattern signal generator 215 receives the above-described signal, and outputs a test signal in the same manner as the above-described embodiments. The signal synthesizer 218 receives the signals, adds a predetermined additional signal, and generates a signal having a predetermined format CN0 to CN9 (N=1 to 7) are signals set in the PTR in a V1 and V2 of corresponding # in FIG. 15.

Fourth Embodiment

Figure 38B:
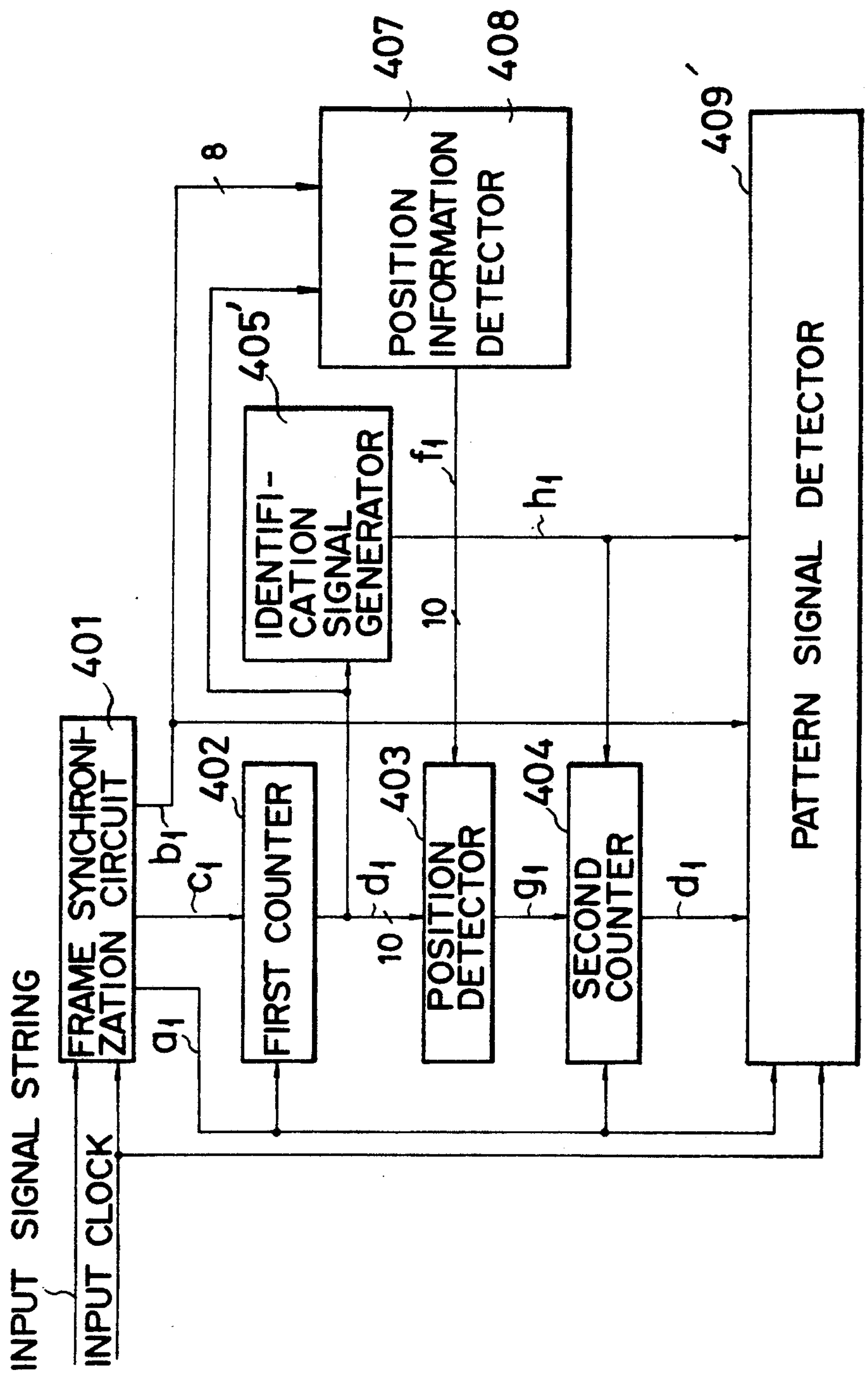

Operation of Extracting 44.736-Mb/s Signal from 51.84-Mb/s Signal String to Detect Error Referring to FIGS. 38A and 38B showing the fourth embodiment, reference numeral 401 denotes a frame synchronization circuit for determining a position of a start byte (reference symbol A1 in FIG. 21) in a frame in an input signal. The frame synchronization circuit 401 establishes frame synchronization by detection of frame synchronization signals A1 and A2 contained in an input signal to output a position signal of "H" level every time position corresponding to the input signal A1.

The frame synchronization circuit 401 also performs conversion of the input clock signal to a byte clock signal (One period corresponds to eight bits of an input clock signal. This byte clock signal is referred to as an input clock signal) operating in the units of bytes, and a conversion of the input signal to eight data signals of $\frac{1}{8}$ frequency.

A first counter 402 has the same function as the first counter 10 in FIG. 19B except that it starts counting from "0" every time a position signal from the frame synchronization circuit becomes "H" level. The first counter 402 can be realized by adding a function for setting the count value to "0" by an external signal to the first counter 10 in FIG. 19B.

In addition, a coincidence discrimination circuit 403, a second counter 404, an identification signal generator 405, and a timing signal generator 406 respectively have the same functions as the circuits 11, 14, 15 and 16 in FIG. 19B, and the identical circuits can be used.

An H1,H2 latch circuit 407 is a circuit for extracting a signal H1,H2 shown in FIG. 21 from the data signal. In this case, count values corresponding to H1 and H2 from the first counter 402 are respectively 270 and 271 in comparison between FIGS. 20 and 21. As a result, the H1,H2 latch circuit 407 constitutes a circuit for outputting a latch pulse every time codes 270 and 271 are input by a combination of gate circuits, e.g., shown in FIG. 31. The H1,H2 latch circuit 407 extracts this signal H1,H2 from the data signal by this latch pulse.

A converter 408 is a circuit for converting the PTR value (FIG. 11) in the signal H1,H2 to a corresponding value in FIG. 20. For example, when the PTR value extracted from the data signal is zero, the converter 408 outputs 273.

In the signal generation side, this conversion is performed by the control circuit 29 including a CPU. In the reception side, however, it is required to perform this conversion in a high speed (one frame per 125 μs). This conversion is, therefore, performed by hardware without a CPU. This converter 408 can be realized by using a memory.

An output from the timing signal generator 406 is the same as the output from the timing signal generator 16 in FIG. 19B. j1 becomes "H" level every time data signal becomes a byte containing the information I shown in FIG. 26 on the basis of the count value of 0 of an output from the second counter 404. k1 becomes "H" level every time the data signal becomes a byte containing five pieces of information I in one byte in the same manner. l1 becomes "H" level every time the data signal becomes a byte containing the information I shown in FIG. 26.

An error detector 409 extracts an information signal from the data signal using j1, k1, and l1. An error detection is performed by using the information signal, the j1, k1, and l1, the clock signal, the input clock signal, and an output from the identification signal generator 405. The error detector 409 can be arranged using the conventional technique, and a description thereof is omitted. A timing relationship between main signals shown in FIGS. 38A and 38B is shown in FIG. 39.

Figure 39:
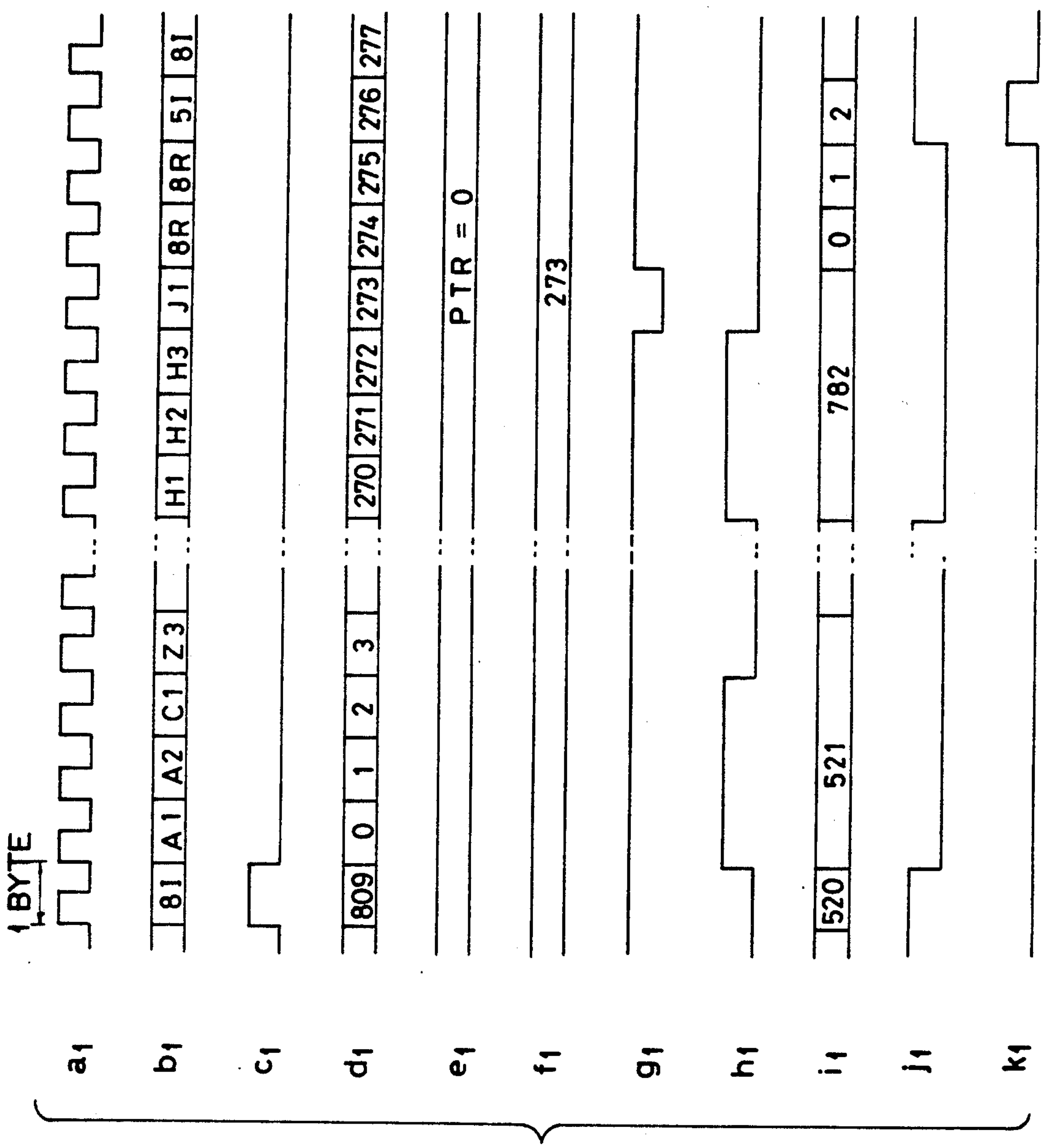
FIG. 39 is a timing chart showing a timing relationship of main signals of FIGS. 38A and 38B.

In FIG. 39, reference symbol $a_1$ denotes a byte clock operating every eight input clocks and reference symbol $b_1$ denotes an input signal represented in the units of bytes. In the signal $b_1$, A1, A2, C1, H1,H2, and H3 are the TOH components, and others are signals shown in FIG. 26 when PTR=0.

In the signal $b_1$, 5I is a byte wherein the five pieces of information I shown in FIG. 26 are contained, and 8I is a part of 200I shown in FIG. 26.

Reference symbol $c_1$ denotes a signal indicating a start position of the frame. In this embodiment, the signal $c_1$ appears earlier than the actual signal (A1) by one byte.

Reference symbol $d_1$ denotes a binary code of the count value of the output from the counter 402. Reference symbol $e_1$ denotes a 10-bit binary code of the PTR value and reference symbol $f_1$ denotes a value converted from the value $e_1$ to be corresponded to the value $d_1$.

Reference symbol $g_1$ denotes a signal indicating a position of the start byte (J1) of a second frame and reference symbol $h_1$ denotes a signal indicating the TOH portion of the first frame.

Reference symbol $i_1$ denotes a count value output from the second counter 404 represented by the binary code. In this signal, a position of J1 always corresponds to 782.

Reference symbol $j_1$ denotes a signal indicating a byte containing information and reference symbol $k_1$ denotes a signal indicating a byte containing five pieces of information I in one byte.

Fifth Embodiment

Figure 40B:
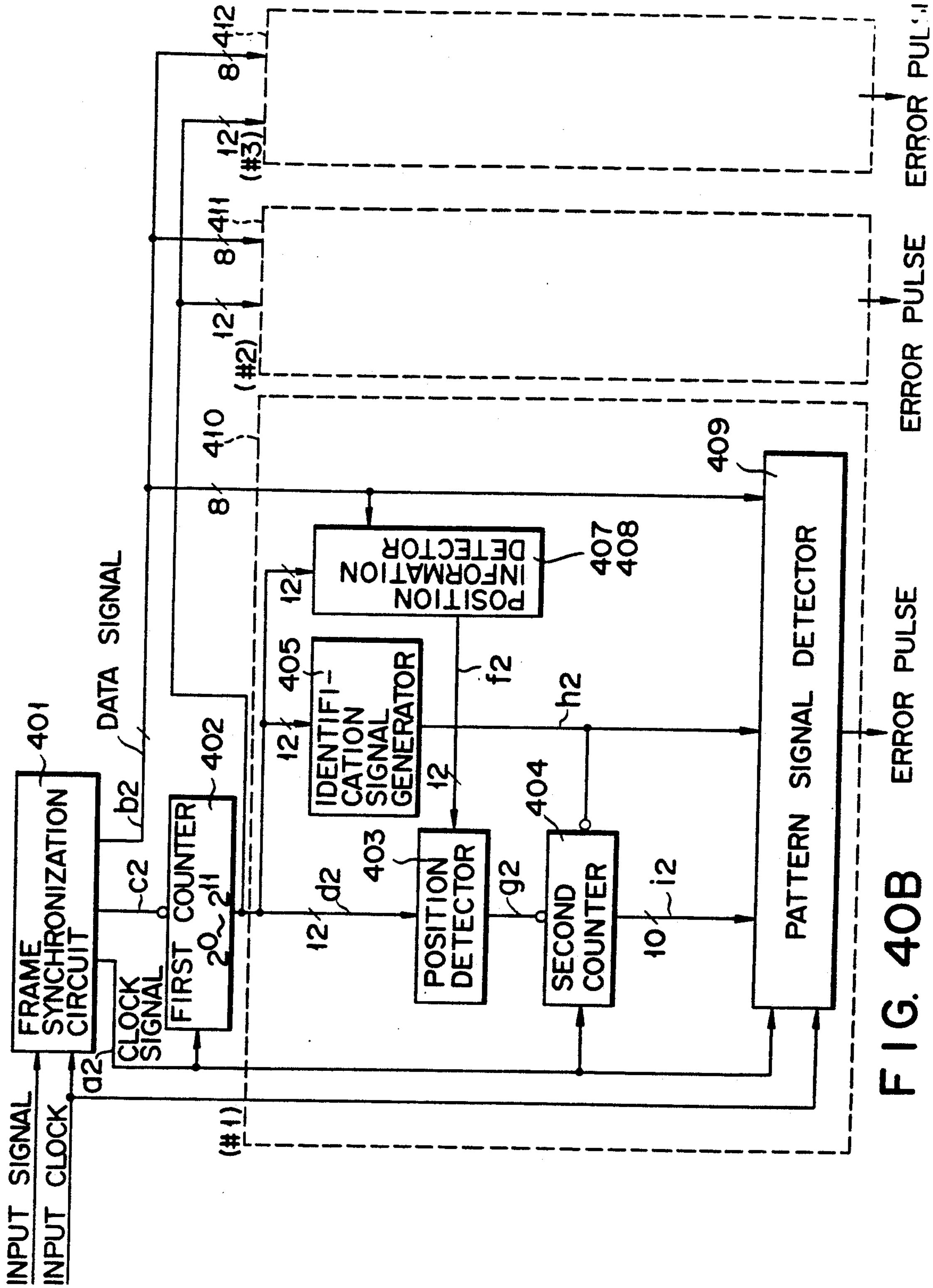

Operation for Performing Error Measurement with Respect to Input Signal of the Second Embodiment FIGS. 40A and 40B show an arrangement of a main part of the fifth embodiment.

Each circuit shown in FIGS. 40A and 40B has the same function as the corresponding circuit shown in FIGS. 38A and 38B and can be made by the same arrangement as in FIGS. 38A and 38B except for an identification signal generator 405.

The identification signal generator 405 has the same function as the identification signal generator 115, and can be arranged by an identical circuit.

Circuits 411 and 412 are circuits for respectively detecting errors in the second (#2) and the third (#3) signal strings. The same circuit as the first (#1) circuit 410 can be used except that a latch position of a signal H1,H2 in the H1,H2 latch circuit 407 is changed.

Figure 41:
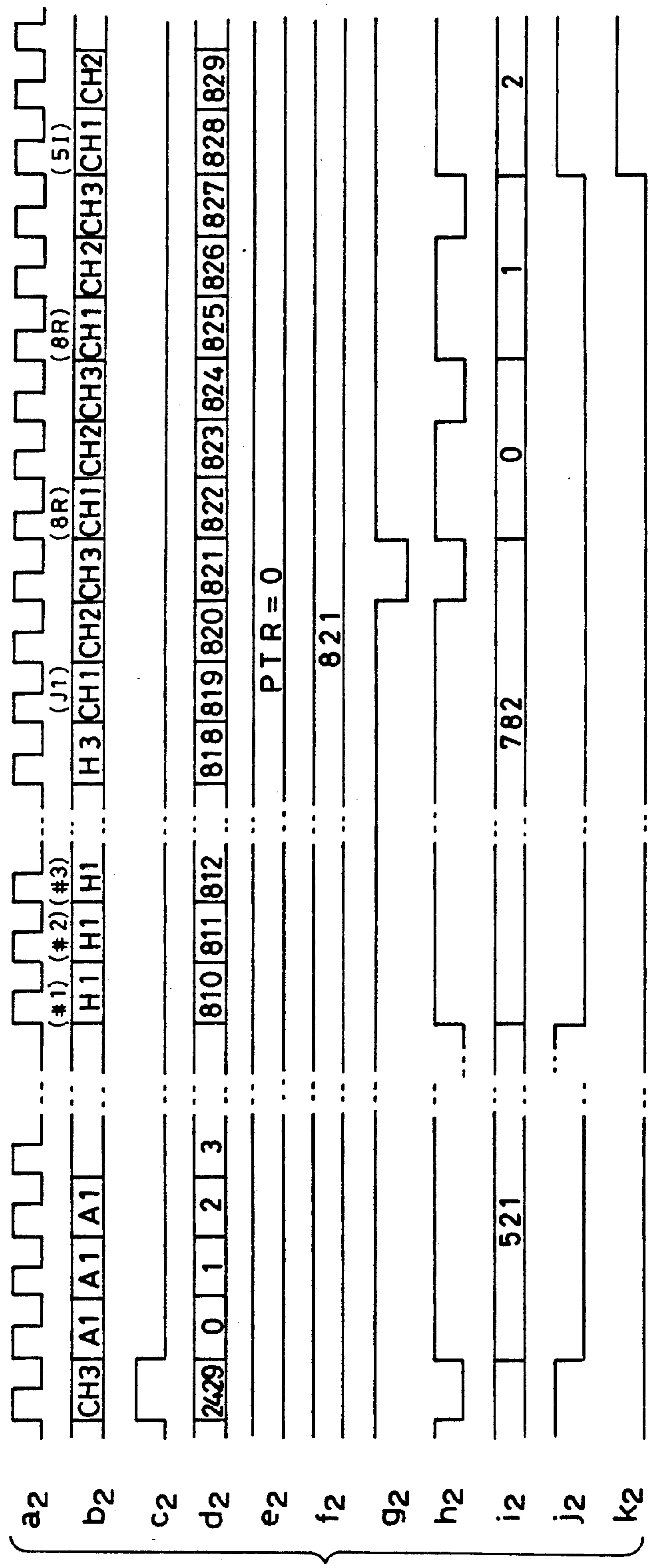
FIG. 41 is a timing chart showing a timing relationship of main signals of FIGS. 40A and 40B.

A timing relationship between FIGS. 40A and 40 shown in FIG. 41.

Note that, when the error measurement is performed only for one signal string, the circuits 411 and 412 can be omitted.

Sixth Embodiment

Figure 42A:
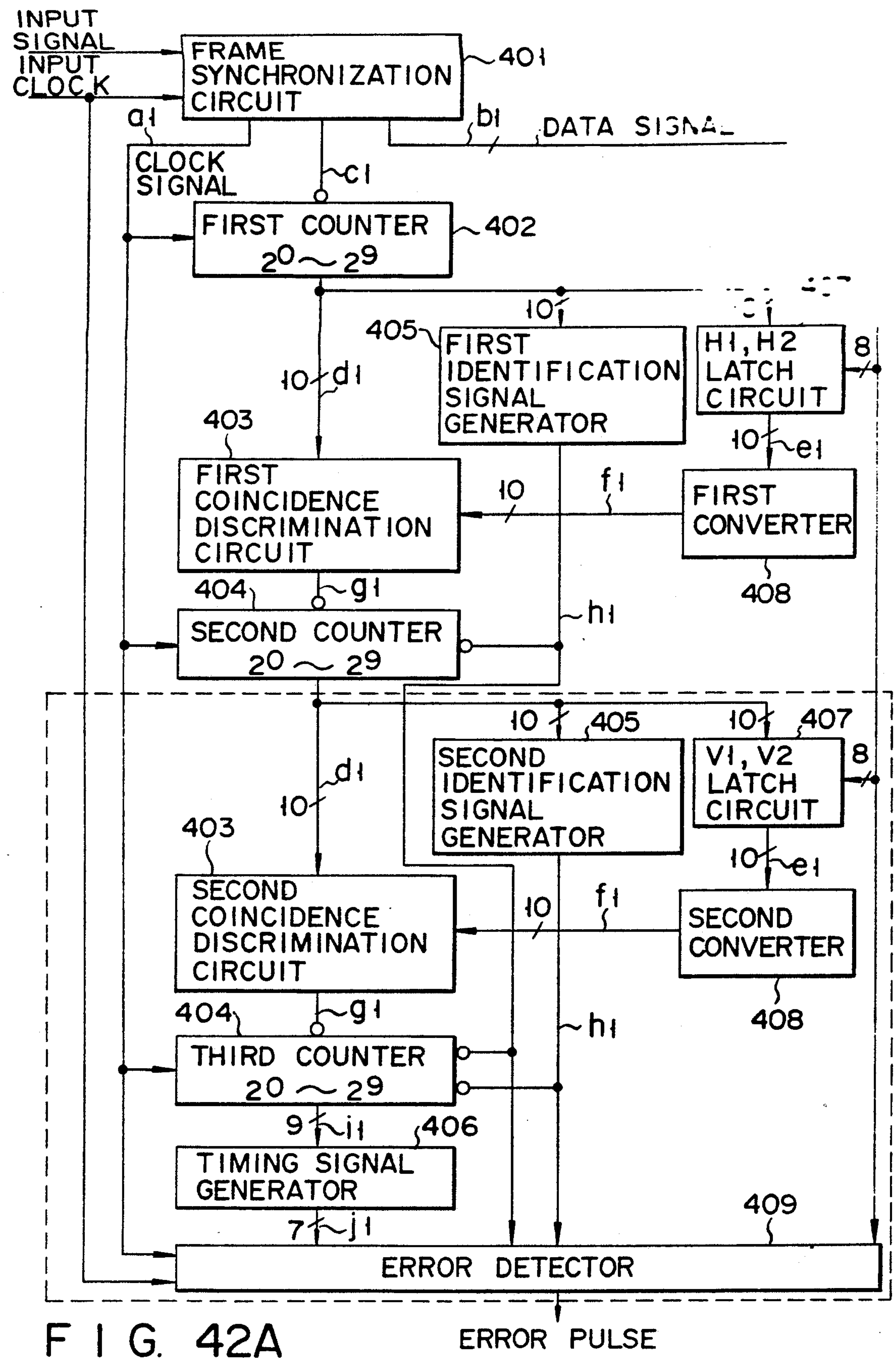
FIGS. 42A and 42B are a block diagram showing a structure of a main part of a signal receiving apparatus when the signal receiving apparatus as the sixth embodiment according to the present invention is used for an error measuring apparatus and a block diagram showing a general structure of FIG. 42A.
Figure 42B:
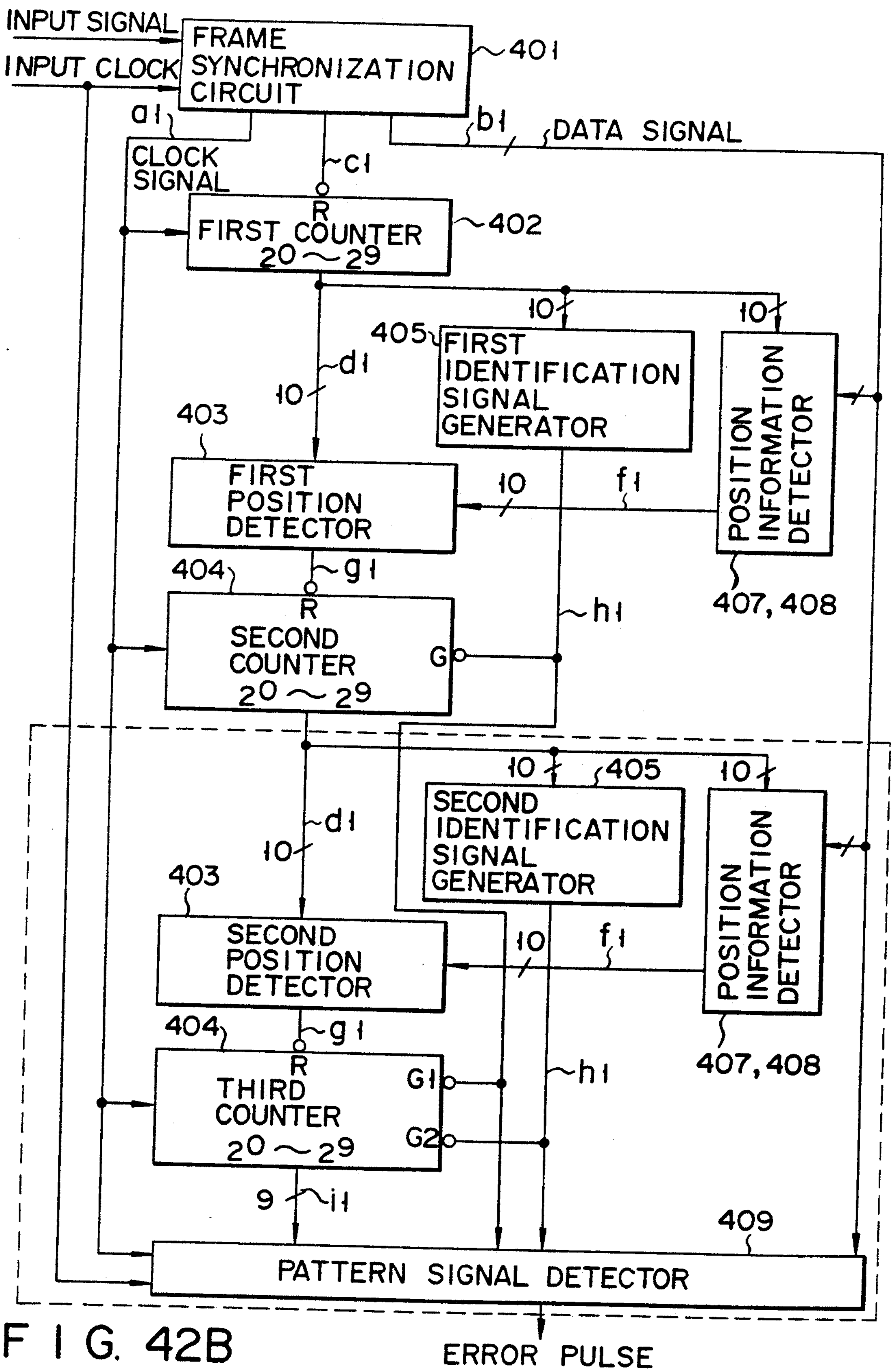

Operation for Performing Error Measurement with Respect to Input Signal of Third Embodiment FIGS. 42A and 42B show an arrangement of a main part of the sixth embodiment.

FIGS. 42A and 42B can be made by the same arrangement as in FIG. 38 except for a first gate circuit 405. The identification signal generator 405 can be made by the same circuit as the identification signal generator 405 in FIG. 40.

Note that FIGS. 42A and 42B are examples of the error measurement of one signal string of 6.312 Mb/s. When a signal to be measured is increased, it can be treated by the arrangement increasing one set of circuits surrounded by the dotted line by one signal system.

According to the present invention, as described above, an excellent, simplest signal generating and receiving apparatuses of a synchronous transfer mode, capable of realizing a unique function of performing quality evaluation tests for a digital communication line system of a synchronous transfer mode such as an SONET and capable of providing a variety of applications can be provided.

Industrial Applicability

A signal generating and receiving apparatuses of a synchronous transfer mode according to the present invention is capable of performing quality evaluation tests including an error rate measurement of a digital communication line system of a synchronous transfer mode such as an SONET.

What is claimed is:

1. A signal generating apparatus of a synchronous transfer mode, wherein one frame includes an additional signal containing region assigned to a plurality of time intervals each having a predetermined duration for containing an additional signal and an information signal containing region serving as a region interleaved with but not overlapping the additional signal containing region, and the information signal includes at least one path overhead signal representing a start portion of the information signal and a pattern signal which appears in a plurality of time intervals each having a predetermined duration and which follows the path overhead signal, thereby generating a signal string containing the additional signal and the information signal in units of frames so as to locate the path overhead signal at an arbitrary position within the information signal containing region, comprising:

a clock generator for generating a system clock having a predetermined frequency corresponding to the one-frame period and a clock obtained by frequency-dividing the system clock by a predetermined value to represent a one-byte unit, a first counter for receiving the clock representing the one-byte unit from said clock generator, repeatedly counting a number of clocks corresponding to the one-frame period, and sequentially outputting count values, an identification signal generator for receiving the count values from said first counter and outputting an identification signal for identifying the additional signal containing region and the information signal containing region by using a count start timing of said first counter as a start of the one-frame period, an address information generator for outputting a desired insertion position of the path overhead signal in the information signal containing region as an address value from the start of the one-frame period and outputting a pointer value corresponding to the address value, a coincidence discrimination circuit for outputting a coincidence signal when the count value from said first counter coincides with the address value from said address information generator, a second counter for repeatedly counting a number of clocks which correspond to the information signal containing region except for the additional signal containing region of the one-frame period, which are output from said clock generator, and each of which represents the one-byte unit, in accordance with the identification signal output from said identification signal generator, and for sequentially outputting count values, a timing signal generator for receiving the count values from said second counter and outputting a timing signal for generating the pattern signal within the information signal containing region, a pattern signal generator for outputting a desired pattern signal during a time interval except for the path overhead signal from the information signal containing region in accordance with the system clock and the clock representing the one-byte unit, both clocks of which are output from said clock generator, an additional signal generator for receiving the count values from said first counter and the pointer value from said address information generator and outputting an additional signal containing at least the pointer value to a time interval of the additional signal containing range with reference to the start of the one-frame period, a path overhead signal generator for receiving the count values from said second counter and outputting a predetermined path overhead signal to a desired position within the information signal containing period, and a signal synthesizer for synthesizing the desired pattern signal from said pattern signal generator, the additional signal containing the pointer value from said additional signal generator, and the predetermined path overhead signal from said path overhead signal generator and outputting a synthesized signal as a predetermined signal string.

2. A signal receiving apparatus of a synchronous transfer mode, wherein one frame includes an additional signal containing region assigned to a plurality of time intervals each having a predetermined duration for containing an additional signal and an information signal containing region serving as a region interleaved with but not overlapping the additional signal containing region, and the information signal includes at least one path overhead signal representing a start portion of the information signal and a pattern signal which appears in a plurality of time intervals each having a predetermined duration and which follows the path overhead signal, thereby generating a signal string containing the additional signal and the information signal in units of frames so as to locate the path overhead signal at an arbitrary position within the information signal containing region, comprising:

a clock generator for generating a system clock having a predetermined frequency corresponding to the one-frame period and a clock obtained by frequency-dividing the system clock by a predetermined value to represent a one-byte unit, a first counter for receiving the clock representing the one-byte unit from said clock generator, repeatedly counting a number of clocks corresponding to the one-frame period, and sequentially outputting count values, an identification signal generator for receiving the count values from said first counter and outputting an identification signal for identifying the additional signal containing region and the information signal containing region by using a count start timing of said first counter as a start of the one-frame period, a position information detector for reading a value of the start position of the information signal in the information signal containing region from the additional signal within the additional signal containing region on the basis of the input signal string, and for outputting a read value, a start position detector for outputting a detection signal in accordance with an output from said first counter and the value representing the start position from said position information detector when the start position in the information signal containing region is detected, a second counter for repeatedly counting a number of clocks corresponding to the entire information signal containing region except for the additional signal containing region from the one-frame period on the basis of the identification signal every time said second counter receives the detection signal from said start position detector, and a pattern signal detector for extracting the pattern signal in accordance with an output from said second counter and the input signal string.

3. A signal generating apparatus wherein one frame includes a time interval A1 ($t_1$) of an additional signal and a time interval B1 ($t_2$) of at least one path overhead signal (POH) added to a start of the additional signal together with a pattern signal for transmitting information, and the path overhead signal and the pattern signal following the path overhead signal generates a signal string started from a desired position of the time interval A1, comprising:

a clock generator for outputting a clock signal obtained by frequency-dividing a system clock signal by L, a first counter for receiving the clock signal, repeatedly counting a number of clocks of a one-frame period ($t_1+t_2$), and outputting count values, an identification signal generator for identifying the time intervals A1 and B1 using a start count timing of said first counter as a start of the frame, an address information generator for outputting the desired position of the path overhead signal inserted in the time interval B1 as an address value from the start of the frame, a coincidence discrimination circuit for outputting a coincidence signal when an output from said first counter coincides with the address value, a second counter for repeatedly counting a number of clocks of the entire time interval B1 except for the time interval A1 in accordance with the clock signal on the basis of the identification signal every time the second counter receives the coincidence signal, a pattern generator for receiving an output from the second counter, the clock signal, and the system clock, and for outputting a desired pattern signal at a position except for the path overhead signal from the time interval B1, an additional signal generator for generating and outputting an additional signal of L-bit parallel data containing a pointer value corresponding to at least the address value, during the time interval A1 with reference to the start of the frame, an overhead signal generator for outputting a path overhead signal to a desired position within the time interval B1 on the basis of an output from the second counter, and a signal synthesizer for synthesizing an output from said pattern generator, an output from said overhead signal generator, and an output from said additional signal generator, and outputting a serial signal string.

4. A signal generating apparatus of a synchronous transfer mode according to claim 3, characterized in that said coincidence discrimination circuit, said second counter connected to said coincidence discrimination circuit, and said pattern generator connected to said second counter constitute a set, and a plurality of sets are connected in parallel with said first counter, said address information generator outputs the desired position of the path overhead signal to be inserted in the time interval B1 as an address value to said coincidence circuit of each set, said additional signal generator generates and outputs an additional signal containing a pointer value corresponding to at least the address value of each set in the time interval A1 with reference to the start of the frame, said overhead signal generator outputs a path overhead signal of each set at a desired position within the time interval B1 on the basis of an output from said second counter of each set, and said signal synthesizer synthesizes an output from said overhead signal generator, an output from said additional signal generator, and an output from said pattern generator of each set, inserts a plurality of desired pattern signals output by said pattern generators of the sets, and output a serial signal string.

5. A signal generating apparatus of a synchronous transfer mode according to claim 3, characterized in that said identification signal generator, said coincidence discrimination circuit and said additional signal generator which have the same input as that of said identification signal generator, said second counter connected to said coincidence discrimination circuit, and said path overhead signal generator connected to said second counter constitute a set, and a plurality of sets are cascade-connected to each other, an input to said coincidence discrimination circuit of a first set is connected to said first counter, and an output from said second counter of a last set is connected to said pattern generator, and said signal synthesizer synthesizes an output from said pattern generator, an output from said overhead signal generator of each set, an output from said identification signal generator of each set, and an output from said additional signal generator of each set, inserts a desired pattern signal output from said pattern generator into the time interval B1, and outputs a serial signal string.

6. A signal receiving apparatus of a synchronous transfer mode, characterized by comprising:

a frame synchronization circuit for receiving a predetermined signal string, outputting a frame synchronization signal synchronized with a frame of the signal string, and at the same outputting a clock signal, a first counter for receiving the clock signal, repeatedly counting a number of clocks of a one-frame period ($t_1+t_2$) in synchronism with the frame synchronization signal, and outputting a count value, an identification signal generator for identifying a time interval A1 of an additional signal and a time interval B1 of an information signal with reference to a start of the frame, a position information detector for reading a value representing a start position of the information signal in the region B1 from the additional signal within the time interval A1 on the basis of the signal string, and outputting a read value, a position detector for outputting a detection signal on the basis of an output from said first counter and the value representing the start position when the start position of the information signal in the region B1 is detected, a second counter for repeatedly counting a number of clocks of the entire time interval B1 except for the time interval A1 from the one-frame period on the basis of the identification signal every time said counter receives the detection signal, and a pattern signal detector for extracting the pattern signal on the basis of an output from said second counter and the signal string.

7. A signal receiving apparatus of a synchronous transfer mode according to claim 6, characterized in that said position detector, said identification signal generator and said position information detector which are connected to an input of said position detector, said second counter connected to said position detector, and said pattern signal detector for detecting the pattern signal on the basis of an output from said second counter and an input signal string constitute one set, and a plurality of sets are connected in series with said first counter.

8. A signal receiving apparatus of a synchronous transfer mode according to claim 6, characterized in that said position detector, said identification signal generator and said position information detector which are connected to an input of said position detector, and said second counter connected to said position detector constitute one set, a plurality of sets are cascade-connected, and an output of said second counter of a last set and an output of said position information detector of each set are connected to said pattern signal detector.

* * * * *